(12) United States Patent
Matsuoka

(10) Patent No.: US 7,986,219 B2
(45) Date of Patent: Jul. 26, 2011

(54) POWER LINE COMMUNICATION SYSTEM

(75) Inventor: Masayoshi Matsuoka, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 907 days.

(21) Appl. No.: 11/948,279

(22) Filed: Nov. 30, 2007

(65) Prior Publication Data

US 2008/0129468 A1 Jun. 5, 2008

(30) Foreign Application Priority Data

Dec. 1, 2006 (JP) ................................. 2006-325909

(51) Int. Cl.
*G08C 19/16* (2006.01)
*G08C 19/12* (2006.01)
*G06F 1/00* (2006.01)
*H04J 3/04* (2006.01)
*H04B 3/00* (2006.01)

(52) U.S. Cl. .................. 340/12.32; 340/13.23; 340/538; 340/7.36; 340/10.34; 713/300; 713/320; 370/536; 375/257

(58) Field of Classification Search .................. None
See application file for complete search history.

(56) References Cited

U.S. PATENT DOCUMENTS

| | | | | |
|---|---|---|---|---|
| 5,491,463 A | * | 2/1996 | Sargeant et al. | 340/12.37 |
| 6,977,578 B2 | * | 12/2005 | Kline | 370/501 |
| 7,346,332 B2 | * | 3/2008 | McCarty et al. | 455/402 |
| 2004/0122531 A1 | * | 6/2004 | Atsuta et al. | 700/1 |

FOREIGN PATENT DOCUMENTS

| | | |
|---|---|---|
| JP | 4-112632 A | 4/1992 |
| JP | 10-174177 A | 6/1998 |
| JP | 2001-145262 A | 5/2001 |
| JP | 2002-111553 A | 4/2002 |
| JP | 2006-148593 A | 6/2006 |
| JP | 2006-197030 | 7/2006 |

OTHER PUBLICATIONS

Japanese Office Action dated May 10, 2011 with English translation (four (4) pages.

* cited by examiner

*Primary Examiner* — Jennifer Mehmood
*Assistant Examiner* — Fekadeselassie Girma
(74) *Attorney, Agent, or Firm* — Crowell & Moring LLP

(57) ABSTRACT

A power line communication system includes: a first electronic instrument and a second electronic instrument, wherein information is received or transmitted between the first electronic instrument and the second electronic instrument which are connected through a communication line using a power line, wherein the first electronic instrument comprises: a key operation unit for accepting a key operation performed by a user; and a transmission unit for transmitting a power-on request signal for requesting the second electronic instrument to be turned on, to the second electronic instrument through the power line based on the key operation in the key operation unit, and the second electronic instrument comprises: a reception unit for receiving the power-on request signal transmitted from the first electronic instrument through the power line; and a power-on control unit for turning on the second electronic instrument based on the power-on request signal received by the reception unit.

4 Claims, 10 Drawing Sheets

FIG.6

| POWER STATE MANAGEMENT TABLE | | |
|---|---|---|
| DATE | FIRST CLIENT TERMINAL APPARATUS | SECOND CLIENT TERMINAL APPARATUS |
| 2006/11/10 17:00 | POWER OFF | POWER OFF |
| 2006/11/10 10:30 | POWER ON | POWER ON |
| 2006/11/10 9:30 | POWER ON | POWER OFF |
| 2006/11/ 9 20:00 | POWER OFF | POWER OFF |
| ⋮ | ⋮ | ⋮ |

POWER LINE COMMUNICATION SYSTEM

BACKGROUND OF THE INVENTION

1. Field of the Invention

The present invention relates to a power line communication system for transmitting and receiving information through a power line among a plurality of electronic instruments.

2. Description of the Related Art

Heretofore, there has been known a technology for power line communications (PLC) for transferring information by superimposing a high-frequency communication signal on a low frequency for supplying power.

As the technology of the power line communications, for example, in Japanese Patent Application Laid-Open Publication No. 2001-145262, the following technology is disclosed. In a power control system in which a plurality of electric instruments are networked by using a power line, and the overall power consumptions are controlled within a rated capacity, by deciding an electric instrument of which power is reducible in real time in response to operating states of the electric instruments, an occurrence of a disadvantage in the operating state of the instrument of which power is reduced, is prevented.

Moreover, for example, in Japanese Patent Application Laid-Open Publication No. 2002-111553, the following power line communication apparatus is disclosed. In the case of returning an ACK frame for approval to a received frame and the like, by setting a transmission output thereof in response to an attenuation rate to a returning destination, transmission power is reduced without increasing the cost and power consumption at the time of reception standby is reduced.

Furthermore, for example, in Japanese Patent Application Laid-Open Publication No. 2006-148593, a power line communication system in which power consumptions of electronic instruments are low and the power line communications can be performed easily, is disclosed.

Incidentally, in a wireless local area network (LAN) system in which the plurality of electronic instruments are connected by a wireless LAN, a remote activation system called Wake-ON-LAN (hereinafter referred to as WOL) is developed. In the WOL, by transmitting a packet called a magic packet to a personal computer on a standby state, which is connected to the wireless LAN, this personal computer can be activated from a remote place.

However, heretofore, in order to realize the remote activation system as described above, because it is necessary to construct the wireless LAN system, there were some problems that the cost is increased and that a burden is imposed on a user.

SUMMARY OF THE INVENTION

It is an object of the present invention to reduce the cost and the burden which are required in order to construct the power line communication system for transmitting or receiving the information among the plurality of electronic instruments interconnected through the power line, by applying the remote activation system for activating the electronic instruments by such a remote operation to the power line communication system.

In accordance with a first aspect of the invention, a power line communication system comprises: a first electronic instrument, a second electronic instrument and a third electronic instrument, wherein information is received or transmitted among the first electronic instrument, the second electronic instrument and the third electronic instrument which are connected through a communication line using a power line, wherein the first electronic instrument comprises:
a key operation unit for accepting a key operation performed by a user; and
a first transmission unit for transmitting a first power-on request signal for requesting the second electronic instrument to be turned on, to the second electronic instrument through the power line based on the key operation in the key operation unit, the second electronic instrument comprises:
a first main processing unit which is turned to a power-on state by receiving power in a power-on mode; and
a first PLC processing unit which is turned to a power-on state by receiving power in a standby mode where the first main processing unit is turned to a power-off state,
  wherein the first PLC processing unit comprises:
    a first reception unit for receiving the first power-on request signal transmitted from the first electronic instrument through the power line in the standby mode;
    a first power-on control unit for supplying the power to the first main processing unit and for turning the first main processing unit to the power-on mode based on the first power-on request signal received by the first reception unit; and
    a second transmission unit for transmitting a second power-on request signal for requesting the third electronic instrument to be turned on, to the third electronic instrument through the power line based on the first power-on request signal received by the first reception unit, and the third electronic instrument comprises:
a second main processing unit which is turned to a power-on state by receiving power; and
a second PLC processing unit which is turned to a power-on state by receiving power in a standby mode where the second main processing unit is turned to the power-off state,
  wherein the second PLC processing unit comprises:
    a second reception unit for receiving the second power-on request signal transmitted from the second electronic instrument through the power line in the standby mode; and
    a second power-on control unit for supplying the power to the second main processing unit and for turning the second main processing unit to the power-on mode based on the second power-on request signal received by the second reception unit.

In accordance with a second aspect of the invention, a power line communication system comprises: a first electronic instrument and a second electronic instrument, wherein information is received or transmitted between the first electronic instrument and the second electronic instrument which are connected through a communication line using a power line, wherein the first electronic instrument comprises:
a key operation unit for accepting a key operation performed by a user; and
a transmission unit for transmitting a power-on request signal for requesting the second electronic instrument to be turned on, to the second electronic instrument through the power line based on the key operation in the key operation unit, and the second electronic instrument comprises:

a reception unit for receiving the power-on request signal transmitted from the first electronic instrument through the power line; and a power-on control unit for turning on the second electronic instrument based on the power-on request signal received by the reception unit.

In accordance with a third aspect of the invention, a power line communication system comprises: a first electronic instrument and a second electronic instrument, wherein information is received or transmitted between the first electronic instrument and the second electronic instrument which are connected through a communication line using a power line, wherein the first electronic instrument comprises:

a power-on key for turning on the first electronic instrument or the second electronic instrument;

a first power-on control unit for turning on the first electronic instrument based on a key operation of the power-on key; and a transmission unit for transmitting a power-on request signal for requesting the second electronic instrument to be turned on, to the second electronic instrument through the power line based on a key operation of the power-on key, and the second electronic instrument comprises:

a reception unit for receiving the power-on request signal transmitted from the first electronic instrument through the power line; and a second power-on control unit for turning on the second electronic instrument based on the power-on request signal received by the reception unit.

BRIEF DESCRIPTION OF THE DRAWINGS

The present invention will become more fully understood from the detailed description given hereinafter and the accompanying drawings given by way of illustration only, and thus are not intended as a definition of the limits of the present invention, and wherein:

FIG. 6 illustrates a power state management table;

DETAILED DESCRIPTION OF PREFERRED EMBODIMENTS

Figure 1:
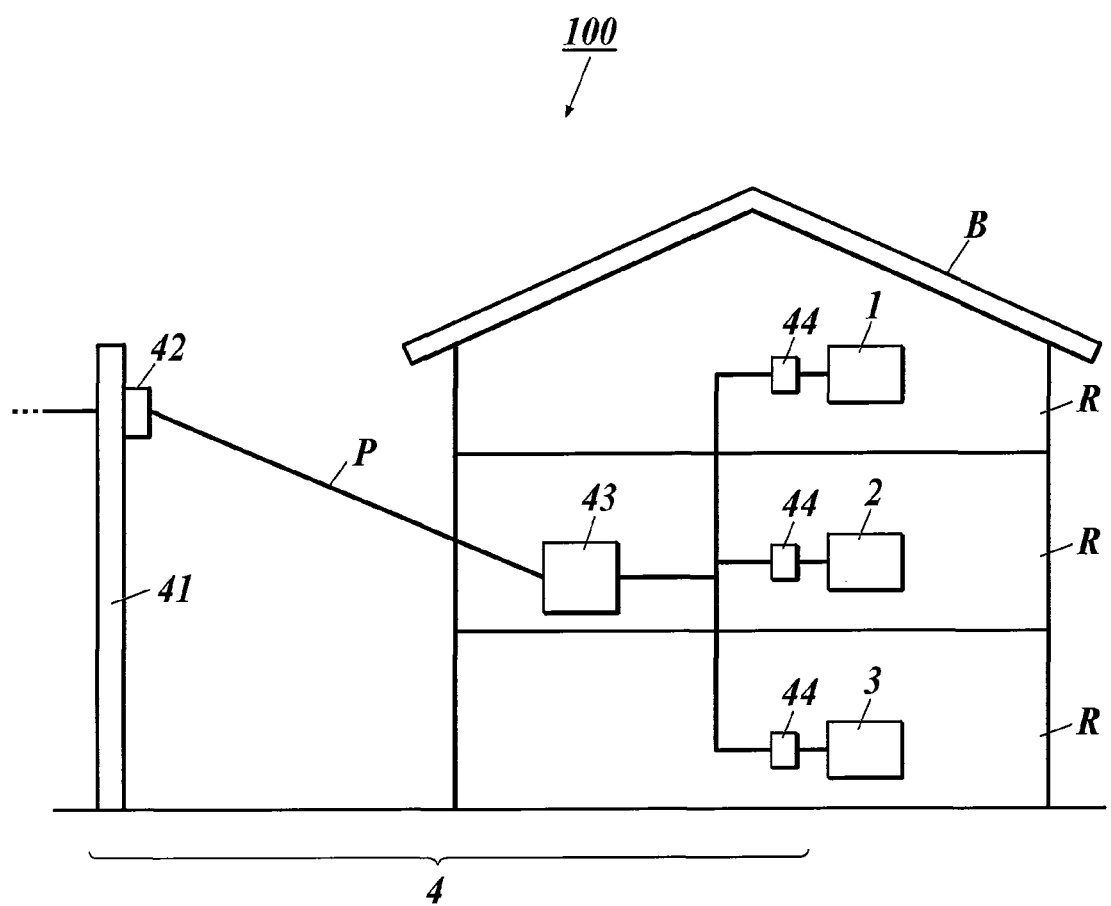
FIG. 1 is a view illustrating an entire configuration of a power line communication system of Embodiment 1.

A description will be made of embodiments of the present invention while referring to the drawings. Note that the scope of the invention is not limited to the illustrated examples.

Embodiment 1

First, while referring to FIGS. 1 to 5, a description will be made of a power line communication system 100 of Embodiment 1 to which the present invention is applied. FIG. 1 is a view showing an entire configuration of the power line communication system 100 in Embodiment 1.

For example, as shown in FIG. 1, the power line communication system 100 of Embodiment 1 is a network realized in a house B. A server apparatus 1 as a first electronic instrument, a first client terminal apparatus 2 as a second electronic instrument and a second client terminal apparatus 3 as a third electronic instrument, which are provided in each room R, are connected through a power communication line 4 as a communication line using a power line P.

For example, the first client terminal apparatus 2 is a reproduction apparatus or the like that reproduces information such as video/audio data and transmits the reproduced video/audio data to the second client terminal apparatus 3 through the server apparatus 1. Moreover, for example, the second client terminal apparatus 3 is an output apparatus or the like that outputs video, audio and the like based on the video/audio data transmitted from the first client terminal apparatus 2 as the reproduction apparatus through the server apparatus 1.

The power line P that composes the power communication line 4 comprises: a high-voltage distribution line between an outdoor distribution substation (not shown) and a pole-mounted transformer 42; a low-voltage distribution line and a drop wire between the pole-mounted transformer 42 and the house B; and a house wire in the house B. The power line P has a function to transmit power of 50/60 Hz, which is sent from a distribution point (not shown) via the distribution substation (not shown) and the pole-mounted transformer 42 provided on a power pole 41, to a plurality of power sockets 44 provided in each room R by a distribution switchboard 43 provided in the house B.

In the power line communication system 100 of Embodiment 1, a power-line superimposition signal having a high-frequency (for example, 10 kHz to 450 kHz) is superimposed on the power transmitted by the power line P that composes the power communication line 4, and the high-frequency signal is transferred. Thereby, the server apparatus 1, the first client terminal apparatus 2 and the second client terminal apparatus 3 which are provided in the house B, are connected, and transmission/reception of the information among the respective apparatuses is realized.

(Configuration of Server Apparatus)

First, a description will be made of a configuration of the server apparatus 1 while referring to FIG. 2.

Figure 2:
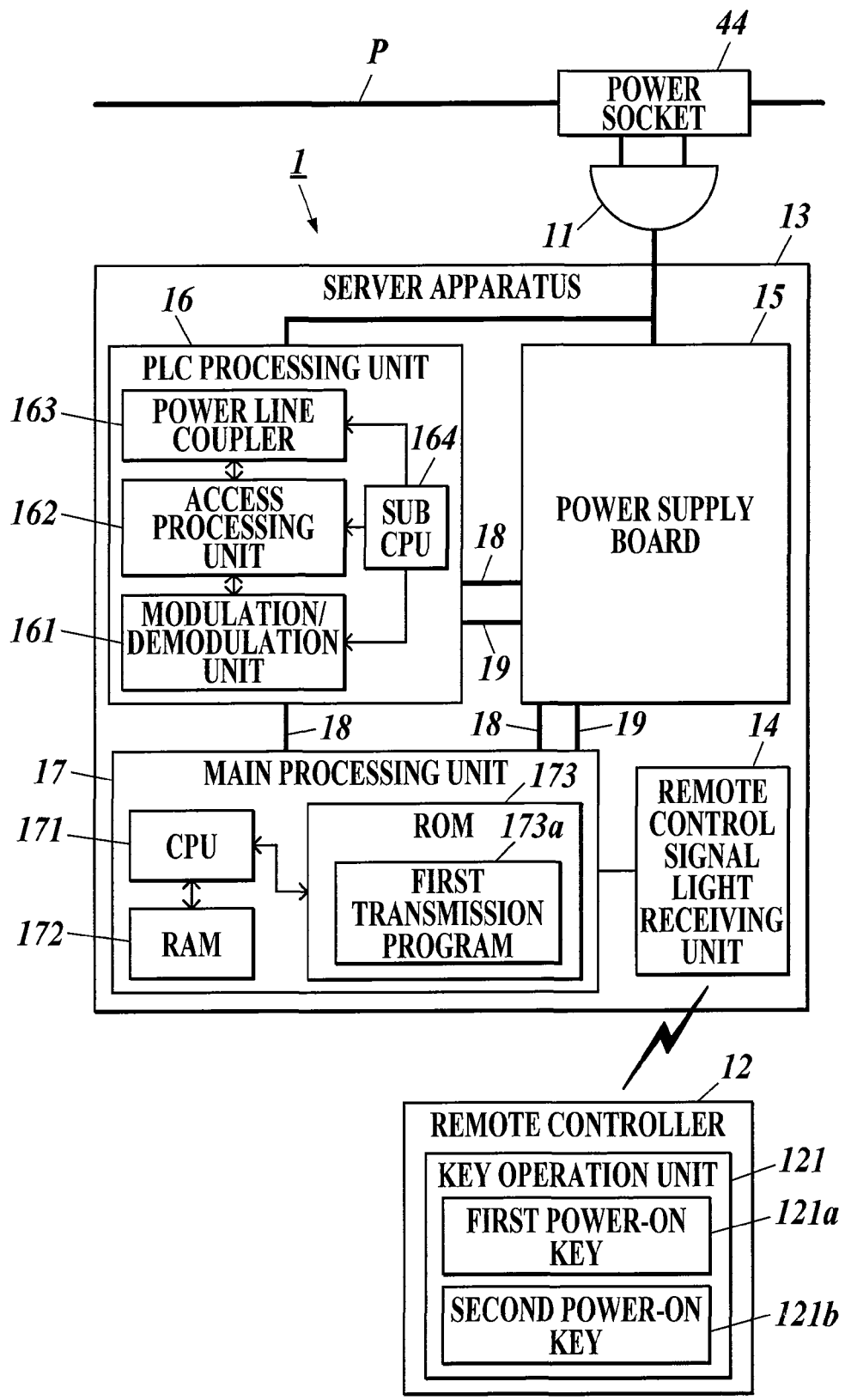
FIG. 2 is a block diagram illustrating a server apparatus in the power line communication system of Embodiment 1.

As shown in FIG. 2, the server apparatus 1 comprises: a power plug 11; a key operation unit 121 provided in a remote controller 12 and the like; a remote control signal light receiving unit 14, a power supply board 15, a PLC processing unit 16, a main processing unit 17, which are provided in an apparatus body 13; and the like. The server apparatus 1 is connected by the power plug 11 to the power socket 44 provided in one room R. The power supply board 15, the PLC processing unit 16 and the main processing unit 17 are connected by a control bus 18, and further, the PLC processing unit 16 and the main processing unit 17 are connected to the power supply board 15 by a power switch line 19.

By inserting the power plug 11 into the power socket 44 to which the power of the power line P is supplied, the power plug 11 receives the power transmitted by the power line P, and transmits the received power to the apparatus body 13.

The key operation unit 121 comprises a plurality of keys, and for example, is provided in the remote controller 12 for remotely operating the server apparatus 1. In the key operation unit 121 provided in the remote controller 12 or the like, when the key is pressed by a user, an input operation signal corresponding to the pressed key is outputted, and the input operation signal is outputted to the main processing unit 17 through the remote control signal light receiving unit 14 provided in the apparatus body 13.

For example, the key operation unit 121 includes: a first power-on key 121a for turning on/off the server apparatus 1; a second power-on key 121b for turning on/off the first client terminal apparatus 2 (or the first client terminal apparatus 2 and the second client terminal apparatus 3) connected to the server apparatus 1 through the power line P by a remote control; and the like.

For example, the power supply board 15 includes a rectifier circuit, a smoothing circuit, a switching element, a pulse transformer, a rectifier diode, a choke coil, a smoothing capacitor, a free wheel diode, and the like, which are not shown in the drawings. The power supply board 15 performs predetermined power processing for the power supplied from the power plug 11, and supplies the power to the PLC processing unit 16 and the main processing unit 17 through the power switch line 19. Note that, in the power supply board 15, similar processing to power processing in the first client terminal apparatus 2 to be described later is performed, and accordingly, a description thereof is omitted here.

For example, the PLC processing unit 16 comprises: a modulation/demodulation unit 161; an access processing unit 162; a digital/analog (D/A) converter (not shown); a band pass filter (BPF) (not shown) for a transmission signal; an amplifier (not shown); a power line coupler 163; a band pass filter (BPF) (not shown) for a reception signal; an automatic gain control (AGC) circuit (not shown); an analog/digital (A/D) converter (not shown); a sub central processing unit (CPU) 164; and the like. The PLC processing unit 16 is connected to the power supply board 15 by the power switch line 19, and is controlled to a power-on state in a power-on mode and a standby mode based on the power supplied from the power supply board 15 through the power switch line 19.

In a transmission mode of transmitting the power-line superimposition signal, the modulation/demodulation unit 161 modulates data to be superimposed on the power line P and to be transmitted, which is inputted from the main processing unit 17. Then, the modulation/demodulation unit 161 creates the power-line superimposition signal, and outputs the created power-line superimposition signal to the access processing unit 162.

Specifically, when a first power-on request signal Sg1 is received from the main processing unit 17, the modulation/demodulation unit 161 modulates the first power-on request signal Sg1, converts the modulated first power-on request signal Sg1 into the power-line super imposition signal, and outputs the power-line superimposition signal to the access processing unit 162.

For example, the modulation/demodulation unit 161 uses an orthogonal frequency division multiplexing (OFDM) modulation method that is less affected by leakage waves from the power line P. Specifically, in the modulation/demodulation unit 161 in which the OFDM modulation system is adopted, serial/parallel conversion is performed for the transmission data inputted from the main processing unit 17, and the transmission data is divided into a plurality of subcarriers. Then, the divided subcarriers are modulated by a modulation method such as binary phase shift keying (BPSK), quadrature phase shift keying (QPSK), 16 quadrature amplitude modulation (16-QAM), 64-QAM or the like. Moreover, inverse discrete Fourier transformer (IDFT) is performed for the modulated subcarriers, and multi-carrier signal waves are created. Furthermore, guard intervals (GIs) for avoiding a multi-path fault are inserted into the created multi-carrier signal waves, and thereafter, the parallel/serial conversion is performed to be merged on a time axis, and then to D/A conversion is performed. Thereby, the power-line superimposition signal for which the OFDM modulation is performed is created.

In the transmission mode of transmitting the power-line superimposition signal, the access processing unit 162 adds header information, such as a destination header indicating a destination address; a transmission source header indicating an address of the server apparatus 1 as a transmission source; and the like, to the power-line superimposition signal which is inputted from the modulation/demodulation unit 161 and which is created based on the transmission data. Thereby, the access processing unit 162 converts it into a transmissible data format. Then, the access processing unit 162 converts the data into an analog signal in the D/A converter at the subsequent stage, removes a noise component in the BPF, and amplifies the analog signal in the amplifier, and thereafter, outputs the amplified analog signal to the power line coupler 163.

Specifically, when the first power-on request signal Sg1 converted into the power-line superimposition signal is inputted from the modulation/demodulation unit 161, the access processing unit 162 adds the destination header indicating an address of the first client terminal apparatus 2 and the transmission source header indicating the address of the server apparatus 1 to the power-line superimposition signal that is based on the first power-on request signal Sg1.

For example, the power line coupler 163 comprises a transformer, a capacitor, and the like, which are not shown. In the transmission mode of transmitting the power-line superimposition signal, the power line coupler 163 superimposes the power-line superimposition signal which is inputted from the access processing unit 162, on the power line P by the transformer and the capacitor, and sends the power-line superimposition signal to the power communication line 4.

Specifically, when the power-line superimposition signal that is based on the first power-on request signal Sg1, to which the header information is added from the access processing unit 162 and which is converted into the transmissible data format, is inputted, the power line coupler 163 superimposes the power-line superimposition signal on the power line P, sends the power-line superimposition signal to the power communication line 4, and transmits the power-line superimposition signal through the power line P to the first client terminal apparatus 2 as the transmission destination.

Note that, in the above-described PLC processing unit 16, in a reception mode of receiving the power-line superimposition signal transmitted from the power line P, the steps which are reversed to those in the transmission mode are performed. A description thereof is omitted here.

In the standby mode where the PLC processing unit 16 is supplied with the power and is turned to a power-on state, and where the main processing unit 17 is not supplied with the power and is turned to a power-off state, the sub CPU 164 controls each element of the power supply board 15 and the PLC processing unit 16.

For example, the main processing unit 17 comprises: a CPU 171; a random access memory (RAM) 172; a read only memory (ROM) 173; and the like. The main processing unit 17 is connected to the power supply board 15 by the power switch line 19. Based on the power supplied from the power supply board 15 through the power switch line 19, the main processing unit 17 is controlled to the power-on state in the power-on mode, and is controlled to the power-off state in the standby mode.

In the power-on mode where the PLC processing unit 16 and the main processing unit 17 are supplied with the power and are turned to the power-on state, the CPU 171 executes a variety of programs stored in the ROM 173 in response to input signals inputted from each unit of the server apparatus 1, and outputs output signals to each unit based on the executed programs. Thereby, the overall operations of the server apparatus 1 are controlled in a centralized manner.

The RAM 172 temporarily stores processing results generated when the variety of programs are executed by the CPU 171, inputted data, and the like.

For example, the ROM 173 stores the variety of programs executed by the CPU 171 in the power-on mode where the PLC processing unit 16 and the main processing unit 17 are supplied with the power and are turned to the power-on state. Specifically, the ROM 173 stores a first transmission program 173a.

For example, the first transmission program 173a is a program for allowing the CPU 171 to realize a function to transmit the first power-on request signal Sg1, which requests the first client terminal apparatus 2 to be turned on, to the first client terminal apparatus 2 through the power line P based on a key operation in the key operation unit 121.

Specifically, in the power-on mode where the PLC processing unit 16 and the main processing unit 17 are supplied with the power and are turned to the power-on state, when the second power-on key 121b provided in the key operation unit 121 of the remote controller 121 is operated to be pushed by the user, an input operation signal corresponding to the second power-on key 121b is inputted to the main processing unit 17 through the remote control signal light receiving unit 14. When the input operation signal corresponding to the second power-on key 121b is inputted from the key operation unit 121, the first power-on request signal Sg1 for requesting the first client terminal apparatus 2 connected to the server apparatus 1 through the power line P, to be turned on is outputted to the PLC processing unit 16. Then, by the modulation/demodulation unit 161 of the PLC processing unit 16, the first power-on request signal Sg1 is converted into a format of the power-line superimposition signal, and thereafter by the access processing unit 162, the destination header indicating the address of the first client terminal apparatus 2 and the transmission source header indicating the address of the server apparatus 1 are added. Moreover, by the power line coupler 163, the power-line superimposition signal that is based on the first power-on request signal Sg1 is superimposed on the power line P. Thereby, the power-line superimposition signal is transmitted to the first client terminal apparatus 2 through the power line P.

The CPU 171 executes the first transmission program 173a described above, to function as a first transmission unit.

(Configuration of First Client Terminal Apparatus)

Next, a description will be made of a configuration of the first client terminal apparatus 2 while referring to FIG. 3. For example, the first client terminal apparatus 2 is a reproduction apparatus or the like, which reproduces the video/audio data and transmits the reproduced video/audio data through the server apparatus 1 to the second client terminal apparatus 3 such as the output apparatus. For example, as the first client apparatus 2, a digital versatile disc (DVD) player, a video recorder, a personal video recorder (PVR), an audio apparatus, a tuner and a set top box (STB) of broadcasting satellite (BS) broadcasting and communication satellite (CS) broadcasting, and the like, can be applied.

Figure 3:
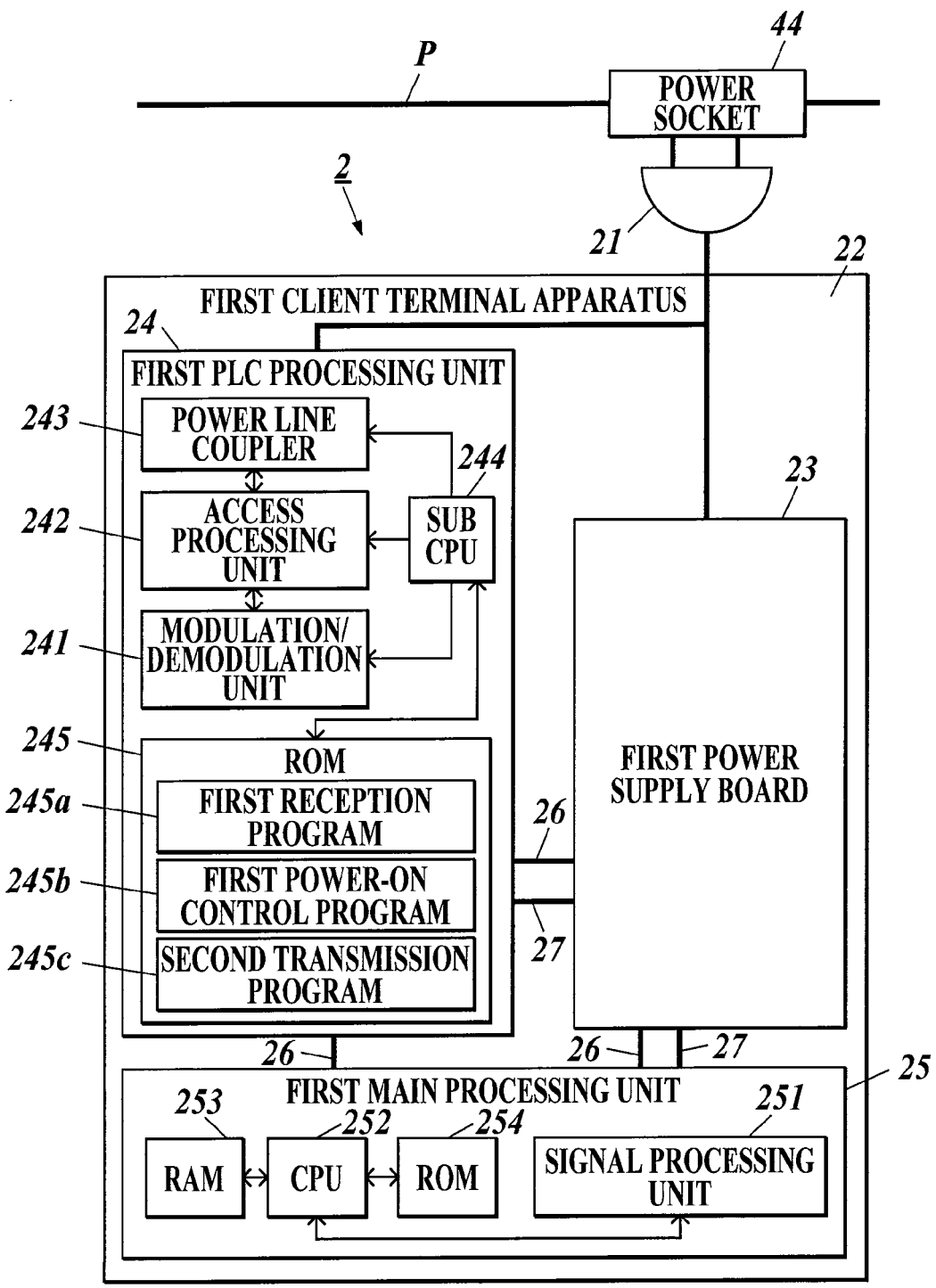
FIG. 3 is a block diagram illustrating a first client terminal apparatus in the power line communication system of Embodiment 1.

As shown in FIG. 3, the first client terminal apparatus 2 comprises: a power plug 21; a first power supply board 23, a first PLC processing unit 24, and a first main processing unit 25 which are provided in an apparatus body 22; and the like. The first client terminal apparatus 2 is connected by the power plug 21 to the power socket 44 provided in one room R. The first power supply board 23, the first PLC processing unit 24 and the first main processing unit 25 are connected by a control bus 26, and further, the first PLC processing unit 24 and the first main processing unit 25 are connected to the first power supply board 23 by a power switch line 27.

By inserting the power plug 21 into the power socket 44 to which the power of the power line P is supplied, the power transmitted by the power line P is received and the received power is transmitted to the apparatus body 22.

For the first power supply board 23, for example, a forward-type switching power system is adopted. Specifically, for example, the first power supply board 23 includes a rectifier circuit, a smoothing circuit, a switching element, a pulse transformer, a rectifier diode, a choke coil, a smoothing capacitor, a free wheel diode, and the like, which are not shown in the drawings. The first power supply board 23 performs predetermined power processing for the power supplied from the power plug 21, and supplies the power to the first PLC processing unit 24 and the first main processing unit 25 through the power switch line 27.

Here, a description will be briefly made of the power processing performed in the first power supply board 23.

For example, the first power supply board 23 rectifies commercial alternating current power supplied from the power line P through the power plug 21 by the rectifier circuit, and supplies the rectified power to the smoothing circuit. The smoothing circuit smoothes the power rectified in the rectifier circuit, converts the power into direct current power, and then supplies the converted power to the switching element. For example, the switching element is a field effect transistor (FET) or the like. The switching element turns on/off the direct current power supplied from the smoothing circuit. Thereby the direct current power is converted into a pulse signal having a high frequency such as 50/60 Hz, and then the pulse signal is applied to a primary side of the pulse transformer. In the pulse transformer, the primary side to which the direct current voltage is applied and a secondary side connected to a load are insulated from each other. When the pulse signal that is from the switching element is applied to the primary side, a high-frequency pulse is outputted from the secondary side. Then, when the switching element is turned on, the current flows on the primary side of the pulse transformer, and the half-wave rectification is performed for the high-frequency pulse obtained from the secondary side of the pulse transformer, by the rectifier diode, and the high-frequency pulse is smoothed by the choke coil and the capacitor to generate direct current power. Meanwhile, when the switching element is turned off, a flyback voltage is generated, and a returning current flows through the free wheel diode. Therefore, the smoothing capacitor will be charged.

In accordance with a control of a sub CPU 244 in the first PLC processing unit 24, which is to be described later, the first power supply board 23 supplies the power to the first PLC processing unit 24, and turns the first PLC processing unit 24 to the power-on state. Meanwhile, the first power supply board 23 does not supply the power to the first main processing unit 25, turns the first main processing unit 25 to the power-off state. Thereby, a standby mode is realized in the first client terminal apparatus 2. Moreover, the first power supply board 23 supplies the power to the first PLC processing unit 24 and the first main processing unit 25, turns both thereof to the power-on state. Thereby, a power-on mode is realized in the first client terminal apparatus 2.

For example, the first PLC processing unit 24 comprises: a modulation/demodulation unit 241; an access processing unit 242; a D/A converter (not shown); a BPF (not shown) for a transmission signal; an amplifier (not shown); a power line coupler 243; a BPF (not shown) for a reception signal; an AGC circuit (not shown); an A/D converter (not shown); a sub CPU 244; a ROM 245; and the like. The first PLC processing unit 24 is connected to the first power supply board 23 by the power switch line 27, and is controlled to the power-on state in the power-on mode and the standby mode based on the power supplied from the first power supply board 23 through the power switch line 27.

For example, the power line coupler 243 comprises a transformer, a capacitor, and the like, which are not shown. In the reception mode of receiving the power-line superimposition signal, the power line coupler 243 extracts the power-line superimposition signal from the power line P by the transformer and the capacitor, removes the noise component by the BPF at the subsequent stage, controls the level of the signal by the AGC circuit, and converts the signal into a digital signal by the A/D converter. Thereafter, the power line coupler 243 supplies the digital signal to the access processing unit 242.

Specifically, the power line coupler 243 extracts the power-line superimposition signal (for example, the first power-on request signal Sg1) transmitted from the server apparatus 1 through the power line P, from the power line P.

Moreover, in a transmission mode of transmitting a power-line superimposition signal (for example, a second power-on request signal Sg2) based on the first power-on request signal Sg1 received in the reception mode, when a power-line superimposition signal that is based on the second power-on request signal Sg2, to which the header information is added from the access processing unit 242 and which is converted into the transmissible data format is inputted through the D/A converter, the BPF and the amplifier, the power line coupler 243 superimposes the power-line superimposition signal on the power line P, sends the power-line superimposition signal to the power communication line 4, and transmits the power-line superimposition signal through the power line P to the second client terminal apparatus 3 as the transmission destination.

In the reception mode of receiving the power-line superimposition signal, the access processing unit 242 obtains the power-line superimposition signal to which the destination header indicating the address of the first client terminal apparatus 2 is added, among the power-line superimposition signals inputted from the power line coupler 243, and sends the obtained power-line superimposition signal to the modulation/demodulation unit 241.

Specifically, when the power-line superimposition signals are inputted from the power line coupler 243, the access processing unit 242 obtains the power-line superimposition signal (for example, the first power-on request signal Sg1) to which the header for destining the address of the first client terminal apparatus 2 to the destination is added, based on the header information added to the power-line superimposition signal. Then, the access processing unit 242 outputs the power-line superimposition signal to the modulation/demodulation unit 241.

Moreover, in the transmission mode of transmitting the power-line superimposition signal (for example, the second power-on request signal Sg2) based on the first power-on request signal Sg1 received in the reception mode, when the second power-on request signal Sg2 converted into the power-line superimposition signal is inputted from the modulation/demodulation unit 241, the access processing unit 242 adds a destination header indicating an address of the second client terminal apparatus 3 and a transmission source header indicating the address of the first client terminal apparatus 2 to the power-line superimposition signal that is based on the second power-on request signal Sg2. Then, the access processing unit 242 converts the power-line superimposition signal into an analog signal in the D/A converter at the subsequent stage, removes a noise component in the BPF, and amplifies the analog signal in the amplifier, and thereafter, outputs the analog signal to the power line coupler 243.

In the reception mode of receiving the power-line superimposition signal, the modulation/demodulation unit 241 demodulates the power-line superimposition signal inputted from the access processing unit 242, converts the power-line superimposition signal into the original data, and outputs the data to the first main processing unit 25.

Specifically, when the power-line superimposition signal converted based on the first power-on request signal Sg1 is inputted from the access processing unit 242, the modulation/demodulation unit 241 demodulates the power-line superimposition signal, converts the power-line superimposition signal into the first power-on request signal Sg1 having the original data format, and outputs the first power-on request signal Sg1 to the first main processing unit 25.

Moreover, in the transmission mode of transmitting the power-line superimposition signal (for example, the second power-on request signal Sg2) based on the first power-on request signal Sg1 received in the reception mode, when the second power-on request signal Sg2 is inputted from the first main processing unit 25, the modulation/demodulation unit 241 modulates the second power-on request signal Sg2, converts the second power-on request signal Sg2 into the power-line superimposition signal, and outputs the power-line superimposition signal to the access processing unit 242.

Note that a similar modulation method to that of the modulation/demodulation unit 161 in the server apparatus 1 is used in the modulation/demodulation unit 241, and a description of the modulation method is omitted here.

In the standby mode where the first PLC processing unit 24 is supplied with the power and is turned to the power-on state, and where the first main processing unit 25 is not supplied with the power and is turned to the power-off state, the sub CPU 244 controls each element of the first power supply board 23 and the first PLC processing unit 24.

For example, the ROM 245 stores a variety of programs such as a first reception program 245a, a first power-on control program 245b and a second transmission program 245c.

For example, the first reception program 245a is a program for allowing the sub CPU 244 to realize a function to receive the first power-on request signal Sg1 transmitted from the server apparatus 1 through the power line P in the standby mode.

Specifically, in the standby mode where the first PLC processing unit 24 is supplied with the power and is turned to the power-on state, and where the first main processing unit 25 is not supplied with the power and is turned to the power-off state, when the power-line superimposition signals superimposed on the power line P are extracted by the power line coupler 243 of the first PLC processing unit 24, the sub CPU 244 allows the access processing unit 242 to obtain the power-line superimposition signal that is based on the first power-on request signal Sg1, to which the destination header indicating the address of the first client terminal apparatus 2 is added, among the extracted power-line superimposition signals. Thereafter, the sub CPU 244 allows the modulation/demodulation unit 241 to demodulate the obtained power-line superimposition signal and to convert the power-line superimposition signal into the first power-on request signal Sg1 for requesting the first client terminal apparatus 2 to be turned on.

The sub CPU 244 executes the first reception program 245a described above, to function as a first reception unit.

For example, the first power-on control program 245b is a program for allowing the sub CPU 244 to realize a function to supply the power to the first main processing unit 25 and turn the first main processing unit 25 to the power-on mode based on the first power-on request signal Sg1 received by the execution of the first reception program 245a, and to turn on the first client terminal apparatus 2.

Specifically, in the standby mode where the first PLC processing unit 24 is turned to the power-on state, and where the first main processing unit 25 is turned to the power-off state, when the first power-on request signal Sg1 is received by the execution of the above-described first reception program 245a, a control signal for instructing the power-on, is sent to the first power supply board 23 by the sub CPU 244 based on the first power-on request signal Sg1. Then, the sub CPU 244 allows the first power supply board 23 to perform the above-described predetermined power processing for the power supplied from the power line P through the power plug 21, and allows the power switch line 27 to supply the power to the first main processing unit 25. Thereby, the sub CPU 244 allows the first main processing unit 25 which was in the power-off state, to shift to the power-on state, and allows the first client terminal apparatus 2 to turn to the power-on mode.

The sub CPU 244 executes the first power-on control program 245b described above, to function as a first power-on control unit.

For example, the second transmission program 245c is a program for allowing the sub CPU 244 to realize a function to transmit the second power-on request signal Sg2 for requesting the second client terminal apparatus 3 to be turned on, to the second client terminal apparatus 3 through the power line P based on the first power-on request signal Sg1 received by the execution of the first reception program 245a.

Specifically, when the first power-on request signal Sg1 is inputted to the first main processing unit 25 by the execution of the first reception program 245a, the second power-on request signal Sg2 for requesting the second client terminal 3 connected to the first client terminal apparatus 2 through the power line P to be turned on, is outputted to the first PLC processing unit 24 by the sub CPU 244 based on the first power-on request signal Sg1. Then, the sub CPU 244 allows the modulation/demodulation unit 241 of the first PLC processing unit 24 to convert the second power-on request signal Sg2 into the format of the power-line superimposition signal. Thereafter, the sub CPU 244 allows the access processing unit 242 to add the destination header indicating the address of the second client terminal apparatus 3 and the transmission source header indicating the address of the first client terminal apparatus 2. Moreover, the sub CPU 244 allows the power line coupler 243 to superimpose the power-line superimposition signal that is based on the second power-on request signal Sg2, on the power line P. Thereby, the power-line superimposition signal is transmitted to the second client terminal apparatus 3 through the power line P.

The sub CPU executes the second transmission program 245c described above, to function as a second transmission unit.

For example, the first main processing unit 25 comprises: a signal processing unit 251; a CPU 252; a RAM 253; a ROM 254; and the like. The first main processing unit 25 is connected to the first power supply board 23 by the power switch line 27, and is controlled to the power-on state in the power-on mode and to the power-off state in the standby mode based on the power supplied from the first power supply board 23 through the power switch line 27.

For example, in accordance with a control by the CPU 252, the signal processing unit 251 performs predetermined signal processing such as processing for reproducing the video/audio data transmitted to the second client terminal apparatus 3.

In the power-on mode where the first PLC processing unit 24 and the first main processing unit 25 are supplied with the power and are turned to the power-on state, the CPU 252 executes a variety of programs stored in the ROM 254 in response to input signals inputted from each element of the first client terminal apparatus 2, and outputs output signals to each element based on the executed programs. Thereby, the overall operations of the first client terminal apparatus 2 are controlled in a centralized manner.

The RAM 253 temporarily stores processing results generated when the variety of programs are executed by the CPU 252, inputted data, and the like.

For example, the ROM 254 stores the variety of programs executed by the CPU 252 in the power-on mode where the second PLC processing unit 34 and the second main processing unit 35 are supplied with the power and are turned to the power-on state.

(Configuration of Second Client Terminal Apparatus)

Next, a description will be made of a configuration of the second client terminal apparatus 3 while referring to FIG. 4. For example, the second client terminal apparatus 3 is an output apparatus or the like, which outputs video/audio based on the video/audio data transmitted from the first client terminal apparatus 2 such as the reproduction apparatus through the server apparatus 1 by the power line P. For example, as the second client terminal apparatus 3, a television set, a personal computer (PC), a projector, and the like can be applied.

Figure 4:
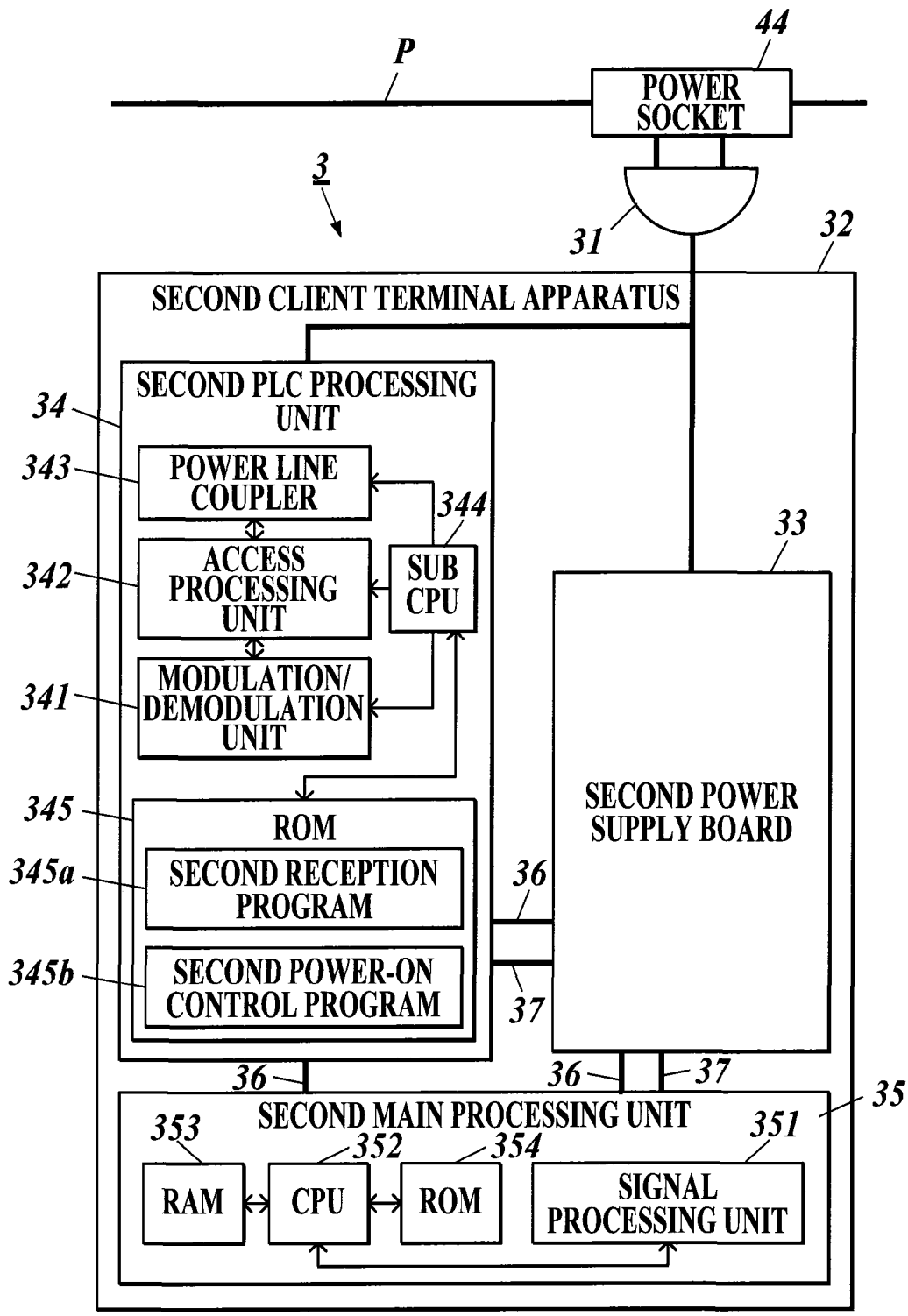
FIG. 4 is a block diagram illustrating a second client terminal apparatus in the power line communication system of Embodiment 1.

As shown in FIG. 4, the second client terminal apparatus 3 comprises: a power plug 31; a second power supply board 33, a second PLC processing unit 34, and a second main processing unit 35, which are provided in an apparatus body 32; and the like. The second client terminal apparatus 3 is connected by the power plug 31 to the power socket 44 provided in one room R. The second power supply board 33, the second PLC processing unit 34 and the second main processing unit 35 are connected by a control bus 36, and further, the second PLC processing unit 34 and the second main processing unit 35 are connected to the second power supply board 33 by a power switch line 37.

By inserting the power plug 31 into the power socket 44 to which the power of the power line P is supplied, the power transmitted by the power line P is received, and the received power is transmitted to the apparatus body 32.

For example, the second power supply board 33 is composed similarly to the first power supply board 23. The second power supply board 33 comprises a rectifier circuit, a smoothing circuit, a switching element, a pulse transformer, a rectifier diode, a choke coil, a capacitor, a free wheel diode, and the like, which are not shown in the drawings. The second power supply board 33 performs predetermined power processing for the power supplied from the power plug 31, and supplies the power to the second PLC processing unit 34 and the second main processing unit 35 through the power switch line 37. The second power supply board 33 performs the power processing similar to that of the first power supply board 23 in the above-described first client terminal apparatus 2, and accordingly, a description thereof is omitted here.

For example, the second PLC processing unit 34 comprises: a modulation/demodulation unit 341; an access processing unit 342; a D/A converter (not shown); a BPF (not shown) for a transmission signal; an amplifier (not shown); a power line coupler 343; a BPF (not shown) for a reception signal; an AGC circuit (not shown); an A/D converter (not shown); a sub CPU 344; a ROM 345; and the like. The second PLC processing unit 34 is connected to the second power supply board 33 by the power switch line 37, and is controlled to the power-on state in the power-on mode and the standby mode based on the power supplied from the second power supply board 33 through the power switch line 37.

For example, the power line coupler 343 comprises a transformer, a capacitor, and the like, which are not shown. In the reception mode of receiving the power-line superimposition signal, the power line coupler 343 extracts the power-line superimposition signal from the power line P by the transformer and the capacitor, removes the noise component by the BPF at the subsequent stage, controls the level of the signal by the AGC circuit, and converts the signal into a digital signal by the A/D converter. Thereafter, the power line coupler 343 supplies the digital signal to the access processing unit 342.

Specifically, the power line coupler 343 extracts the power-line superimposition signal (for example, the second power-on request signal Sg2) transmitted from the first client apparatus 2 through the power line P, from the power line P.

In the reception mode of receiving the power-line superimposition signal, the access processing unit 342 obtains the power-line superimposition signal to which the destination header indicating the address of the first client terminal apparatus 2 is added, among the power-line superimposition signals inputted from the power line coupler 343, and sends the obtained power-line superimposition signal to the modulation/demodulation unit 341.

Specifically, when the power-line superimposition signals are inputted from the power line coupler 343 through the BPF, the AGC circuit and the A/D converter, the access processing unit 342 obtains the power-line superimposition signal (for example, the second power-on request signal Sg2) to which the header for destining the address of the second client terminal apparatus 3 to the destination is added, based on the header information added to the power-line superimposition signal. Then, the access processing unit 342 outputs the power-line superimposition signal to the modulation/demodulation unit 341.

In the reception mode of receiving the power-line superimposition signal, the modulation/demodulation unit 341 demodulates the power-line superimposition signal inputted from the access processing unit 342, converts the power-line superimposition signal into the original data, and outputs the data to the second main processing unit 35.

Specifically, when the power-line superimposition signal converted based on the second power-on request signal Sg2 is inputted from the access processing unit 342, the modulation/demodulation unit 341 demodulates the power-line superimposition signal, converts the power-line superimposition signal into the second power-on request signal Sg2 having the original data format, and outputs the second power-on request signal Sg2 to the second main processing unit 35.

Note that a similar modulation method to those of the modulation/demodulation units 161 and 241 in the server apparatus 1 and the first client terminal apparatus 2 is used in the modulation/demodulation unit 341, and a description of the modulation method is omitted here.

Moreover, in the above-described second PLC processing unit 34, in the transmission mode of transmitting the power-line superimposition signal through the power line P, the steps which are reversed to those in the reception mode are performed. A description thereof is omitted here.

In the standby mode where the second PLC processing unit 34 is supplied with the power and is turned to the power-on state, and where the second main processing unit 35 is not supplied with the power and is turned to the power-off state, the sub CPU 344 controls each element of the second power supply board 33 and the second PLC processing unit 34.

For example, the ROM 345 stores a variety of programs such as a second reception program 345a and a second power-on control program 345b.

For example, the second reception program 345a is a program for allowing the sub CPU 344 to realize a function to receive the second power-on request signal Sg2 transmitted from the first client apparatus 2 through the power line P in the standby mode.

Specifically, in the standby mode where the second PLC processing unit 34 is supplied with the power and is turned to the power-on state, and where the second main processing unit 35 is not supplied with the power and is turned to the power-off state, when the power-line superimposition signals superimposed on the power line P are extracted by the power line coupler 343 of the second PLC processing unit 34, the sub CPU 344 allows the access processing unit 342 to obtain the power-line superimposition signal that is based on the second power-on request signal Sg2, to which the destination header indicating the address of the second client terminal apparatus 3 is added, among the extracted power-line superimposition signals. Thereafter, the sub CPU 344 allows the modulation/demodulation unit 341 to demodulate the obtained power-line superimposition signal and to convert the power-line superimposition signal into the second power-on request signal Sg2 for requesting the second client terminal apparatus 3 to be turned on.

The sub CPU 344 executes the second reception program 345a described above, to function as a second reception unit.

For example, the second power-on control program 345b is a program for allowing the sub CPU 344 to realize a function to supply the power to the second main processing unit 35 and turn the second main processing unit 35 to the power-on mode based on the second power-on request signal Sg2 received by the execution of the second reception program 345a, and to turn on the second client terminal apparatus 3.

Specifically, in the standby mode where the second PLC processing unit 34 is turned to the power-on state, and where the second main processing unit 35 is turned to the power-off state, when the second power-on request signal Sg2 is received by the execution of the above-described second reception program 345a, a control signal for instructing the power-on, is sent to the second power supply board 33 by the sub CPU 344 based on the second power-on request signal Sg2. Then, the sub CPU 344 allows the second power supply board 33 to perform the above-described predetermined power processing for the power supplied from the power line P through the power plug 31, and allows the power switch line 37 to supply the power to the second main processing unit 35. Thereby, the sub CPU 344 allows the second main processing unit 35 which was in the power-off state, to shift to the power-on state, and allows the second client terminal apparatus 3 to turn to the power-on mode.

The sub CPU 344 executes the second power-on control program 345b described above, to function as a second power-on control unit.

For example, the second main processing unit 35 comprises: a signal processing unit 351; a CPU 352; a RAM 353; a ROM 354; and the like. The second main processing unit 35 is connected to the second power supply board 33 by the power switch line 37, and is controlled to the power-on state in the power-on mode and to the power-off state in the standby mode based on the power supplied from the second power supply board 33 to the power switch line 37.

For example, in accordance with a control by the CPU 352, the signal processing unit 351 performs predetermined signal processing such as processing for outputting the video/audio data received from the first client terminal apparatus 2.

In the power-on mode where the second PLC processing unit 34 and the second main processing unit 35 are supplied with the power and are turned to the power-on state, the CPU 352 executes a variety of programs stored in the ROM 354 in response to input signals inputted from each element of the second client terminal apparatus 3, and outputs output signals to each element based on the executed programs. Thereby, the overall operations of the second client terminal apparatus 3 are controlled in a centralized manner.

The RAM 353 temporarily stores processing results generated when the variety of programs are executed by the CPU 352, inputted data, and the like.

For example, the ROM 354 stores the variety of programs executed by the CPU 352 in the power-on mode where the second PLC processing unit 34 and the second main processing unit 35 are supplied with the power and are turned to the power-on state.

Figure 5:
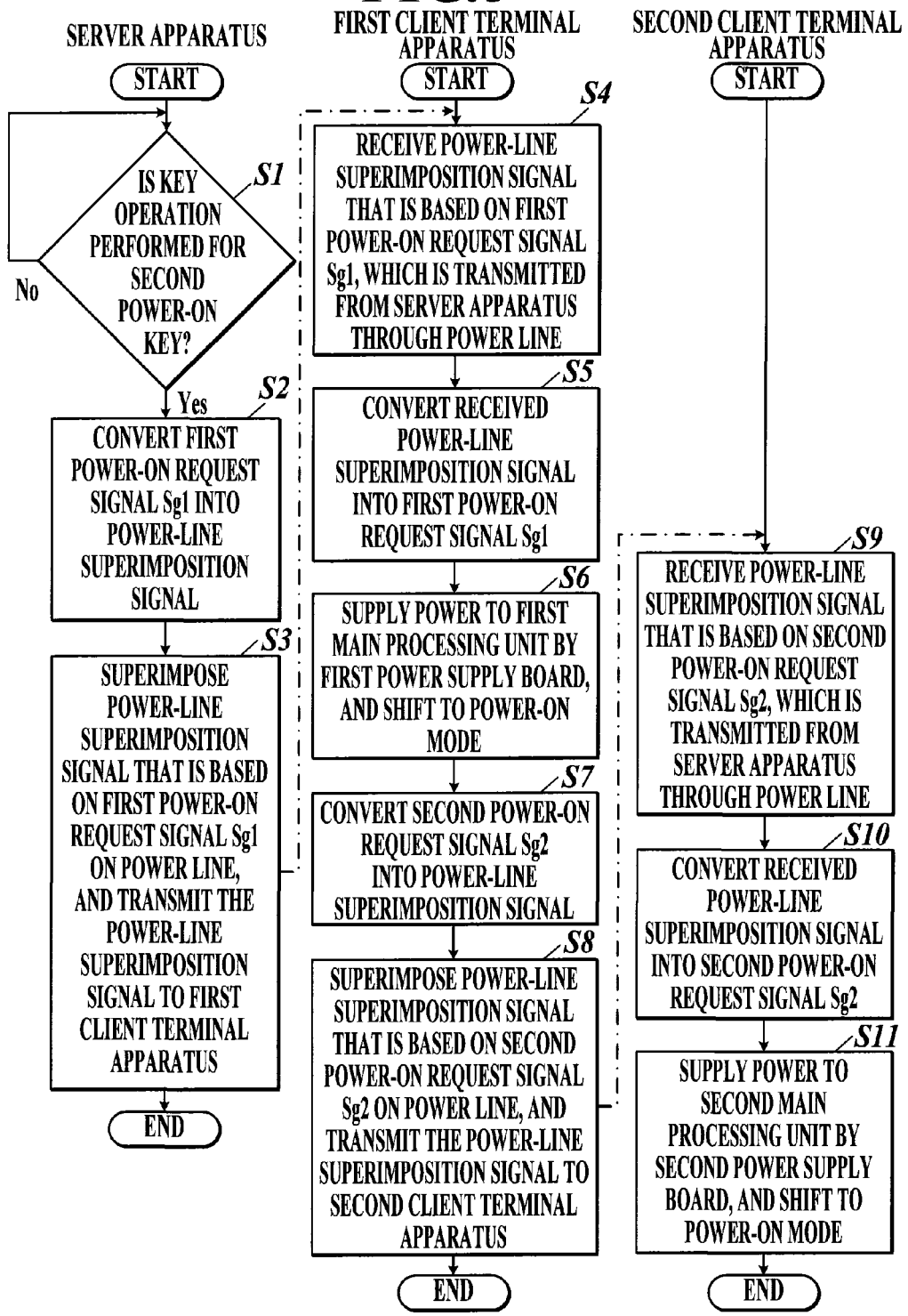
FIG. 5 is a flowchart illustrating remote activation processing in the power line communication system of Embodiment 1.

Next, while referring to FIG. 5, a description will be made of remote activation processing executed in the server apparatus 1, the first client terminal apparatus 2 and the second client terminal apparatus 3.

First, the CPU 171 of the server apparatus 1 monitors the key operation in the key operation unit 121. In Step S1, the CPU 171 determines whether or not the second power-on key 121b in the key operation unit 121 is operated. In Step S1, in the case of determining that the second power-on key 121b is operated (Step S1; Yes), the CPU 171 of the server apparatus 1 allows the modulation/demodulation unit 161 and the access processing unit 162 of the PLC processing unit 16 to convert the first power-on request signal Sg1 for requesting the first client terminal apparatus 2 to be turned on, into the power-line superimposition signal in Step S2. Then, in Step S3, the CPU 171 allows the power line coupler 163 of the PLC processing unit 16 to superimpose the power-line superimposition signal that is based on the first power-on request signal Sg1, on the power line P. Thereby, the first power-on request signal Sg1 is transmitted to the first client terminal apparatus 2, and this processing is ended.

Next, in Step S4, in the standby mode, the sub CPU 244 in the first PLC processing unit 24 of the first client terminal apparatus 2 allows the power line coupler 243 of the first PLC processing unit 24 to obtain the power-line superimposition signal that is based on the first power-on request signal Sg1, which is transmitted from the server apparatus 1. Then, in Step S5, the sub CPU 244 allows the access processing unit 242 and the modulation/demodulation unit 241 of the first PLC processing unit 24 to demodulate the power-line superimposition signal and to convert the power-line superimposition signal into the first power-on request signal Sg1. Then, in Step S6, the control signal for instructing the power-on, is sent to the first power supply board 23 based on the first power-on request signal Sg1 transmitted from the server apparatus 1. Then, the sub CPU 244 allows the first power supply board 23 to supply the power to the first main processing unit 25 which was in the power-off state, and the first main processing unit 25 shifts to the power-on state. Moreover, the sub CPU 244 allows the first client terminal apparatus 2 to shift from the standby mode to the power-on mode.

Next, in Step S7, the sub CPU 244 allows the modulation/demodulation unit 241 and the access processing unit 242 of the first PLC processing unit 24 to convert the second power-on request signal Sg2 for requesting the second client terminal apparatus 3 to be turned on, into the power-line superimposition signal. Then, in Step S8, the sub CPU 244 allows the power line coupler 243 of the first PLC processing unit 24 to superimpose the power-line superimposition signal that is based on the second power-on request signal Sg2, on the power line P. Thereby, the second power-on request signal Sg2 is transmitted to the second client terminal apparatus 3, and this processing is ended.

Furthermore, in Step S9, in the standby mode, the sub CPU 344 in the second PLC processing unit 34 of the second client terminal apparatus 3 allows the power line coupler 343 of the second PLC processing unit 34 to obtain the power-line superimposition signal that is based on the second power-on request signal Sg2, which is transmitted from the first client terminal apparatus 2. Then, in Step S10, the sub CPU 344 allows the access processing unit 342 and the modulation/demodulation unit 341 of the second PLC processing unit 34 to demodulate the power-line superimposition signal and to convert the power-line superimposition signal into the second power-on request signal Sg2. Then, in Step S11, the control signal for instructing the power-on, is sent to the second power supply board 33 based on the second power-on request signal Sg2 transmitted from the first client terminal apparatus 2. Then, the sub CPU 344 allows the second power supply board 33 to supply the power to the second main processing unit 35 which was in the power-off state, and the second main processing unit 35 shifts to the power-on state. Moreover, the sub CPU 344 allows the second client terminal apparatus 3 to shift from the standby mode to the power-on mode, and this processing is ended.

Here, the power line communication system 100 of Embodiment 1 may be configured so as to be able to perform a detail power control that is based on the power states of the first client terminal apparatus 2 and the second client terminal apparatus 3.

Specifically, for example, a power state management table as illustrated in FIG. 6 is provided in the server apparatus 1. When the first client terminal apparatus 2 or the second client terminal apparatus 3 shifts to the power-on or the power-off, each power state (that is, power-on/power-off) of the first client terminal apparatus 2 and the second client terminal apparatus 3 is stored based on power-on shift signal/power-off shift signal transmitted from these apparatuses. Then, in the execution of the above-described first transmission program 173a, the power states of the first client terminal apparatus 2 and the second client terminal apparatus 3 are read out with reference to the power state management table, and the data outputted from the server apparatus 1 is made variable based on the power states of the first client terminal apparatus 2 and the second client terminal apparatus 3, which are read out from the power state management table.

For example, when the first client terminal apparatus 2 and the second client terminal apparatus 3 are turned off, data indicating that the second client terminal apparatus 3 is turned off is transmitted to the first client terminal apparatus 2 together with the first power-on request signal Sg1. Meanwhile, when only the first client terminal apparatus 2 is turned off, data indicating that the second client terminal apparatus 3 is turned on is transmitted to the first client terminal apparatus 2 together with the first power-on request signal Sg1. Meanwhile, when only the second client terminal apparatus 3 is turned off, data indicating that the first client terminal apparatus 2 is turned on is transmitted to the second client terminal apparatus 3 (here, the second electronic instrument) together with the first power-on request signal Sg1. Meanwhile, when both of the first client terminal apparatus 2 and the second client terminal apparatus 3 are in the power-on state, the first power-on request signal Sg1 is not transmitted.

According to such a configuration, the power-on request signal is transmitted only to the apparatus that is turned off, and accordingly, the power-on request signal can be prevented from being transmitted wastefully.

In accordance with the power line communication system 100 of Embodiment 1 according to the present invention as described above, the server apparatus 1 comprises the key operation unit 121 for accepting the key operation performed by the user. By the CPU 171 executing the first transmission program 173a, the first power-on request signal Sg1 for requesting the first client terminal apparatus 2 to be turned on, is transmitted to the first client terminal apparatus 2 through the power line P based on the key operation in the key operation unit 121. Moreover, the first client terminal apparatus 2 comprises: the first main processing unit 25 which is turned to a power-on state by receiving the power in the power-on mode; and the first PLC processing unit 24 which is turned to the power-on state by receiving the power in the standby mode where the first main processing unit 25 is turned to the power-off state. In the first PLC processing unit 24, by the sub CPU 244 executing the first reception program 245a, in the standby mode, the first client terminal apparatus 2 receives the first power-on request signal Sg1 transmitted from the server apparatus 1 through the power line P. Moreover, by the sub CPU 244 executing the first power-on control program 245b, the first main processing unit 25 is supplied with the power and is turned to the power-on mode based on the first power-on request signal Sg1 received by the execution of the first reception program 245a. Furthermore, by the sub CPU 244 executing the second transmission program 245c, based on the first power-on request signal Sg1 received by the execution of the first reception program 245a, the second power-on request signal Sg2 for requesting the second client terminal apparatus 3 to be turned on, is transmitted to the second client terminal apparatus 3 through the power line P. Furthermore, the second client terminal apparatus 3 comprises: the second main processing unit 35 which is turned to the power-on state by receiving the power in the power-on mode; and the second PLC processing unit 34 which is turned to the power-on state by receiving the power in the standby mode where the second main processing unit 35 is turned to the power-off state. In the second PLC processing unit 34, by the sub CPU 344 executing the second reception program 345a, in the standby mode, the second client terminal apparatus 3 receives the second power-on request signal Sg2 transmitted from the first client terminal apparatus 2 through the power line P. Moreover, by the sub CPU 344 executing the second power-on control program 345b, based on the second power-on request signal Sg2 received by the execution of the second reception program 345a, the second main processing unit 35 is supplied with the power and is turned to the power-on mode.

Hence, by applying a remote activation system for activating the electronic instruments connected to the power line P by the remote operation, to the power line communication system 100 for transmitting or receiving the information among the plurality of electronic instruments connected through the power line P, it is possible to reduce the cost and the burden which are required for constructing the system. Moreover, when the power is supplied to the PLC processing units (for example, the first PLC processing unit 24 and the second PLC processing unit 34) of the electronic instruments (the first client terminal apparatus 2 and the second client terminal apparatus 3) to be remotely activated, it is unnecessary to supply the power to the main processing units (for example, the first main processing unit 25 and the second main processing unit 35). Therefore, it is possible to reduce standby consumptions of the electronic instruments to be remotely activated. Furthermore, by simply performing the predetermined key operation in the first electronic instrument, it becomes possible to remotely activate the second electronic instrument and the third electronic instrument which are connected to the first electronic instrument. Therefore, the convenience of the electronic instruments can be enhanced.

Embodiment 2

Next, while referring to FIGS. 7 to 10, a description will be made of a power line communication system 200 of Embodiment 2 to which the present invention is applied.

Note that, in the following description, the same reference numerals are assigned to the same elements as those in Embodiment 1, and a description thereof will be omitted.

Figure 7:
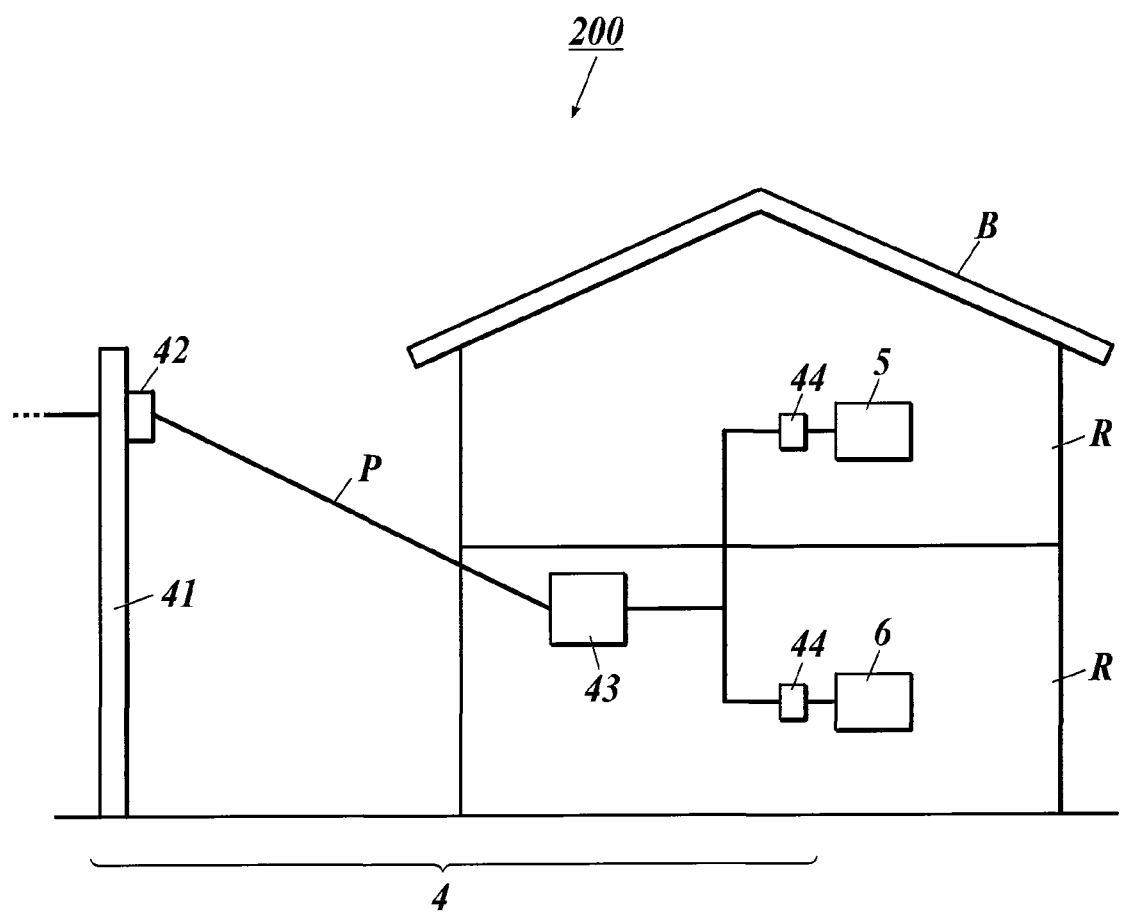
FIG. 7 is a view illustrating an entire configuration of a power line communication system of Embodiment 2.

For example, as shown in FIG. 7, the power line communication system 200 of Embodiment 2 is a network realized in the house B. In the power line communication system 200, a server apparatus 5 as a first electronic instrument and a client terminal apparatus 6 as a second electronic instrument, which are provided in each room R, are connected through the power communication line 4 as the communication line using the power line P.

Here, in the power line communication system 200 of Embodiment 2, when the server apparatus 5 is turned on based on a key operation of a power-on key 121c in the key operation unit 121, the client terminal apparatus 6 connected to the server apparatus 5 through the power communication line 4 is also remotely activated. In such a way, by simply activating the server apparatus 5, the client terminal apparatus 6 is also remotely activated, and accordingly, the convenience in the power line communication system 200 is enhanced.

(Configuration of Server Apparatus)

First, a description will be made of a configuration of the server apparatus 5 while referring to FIG. 8.

Figure 8:
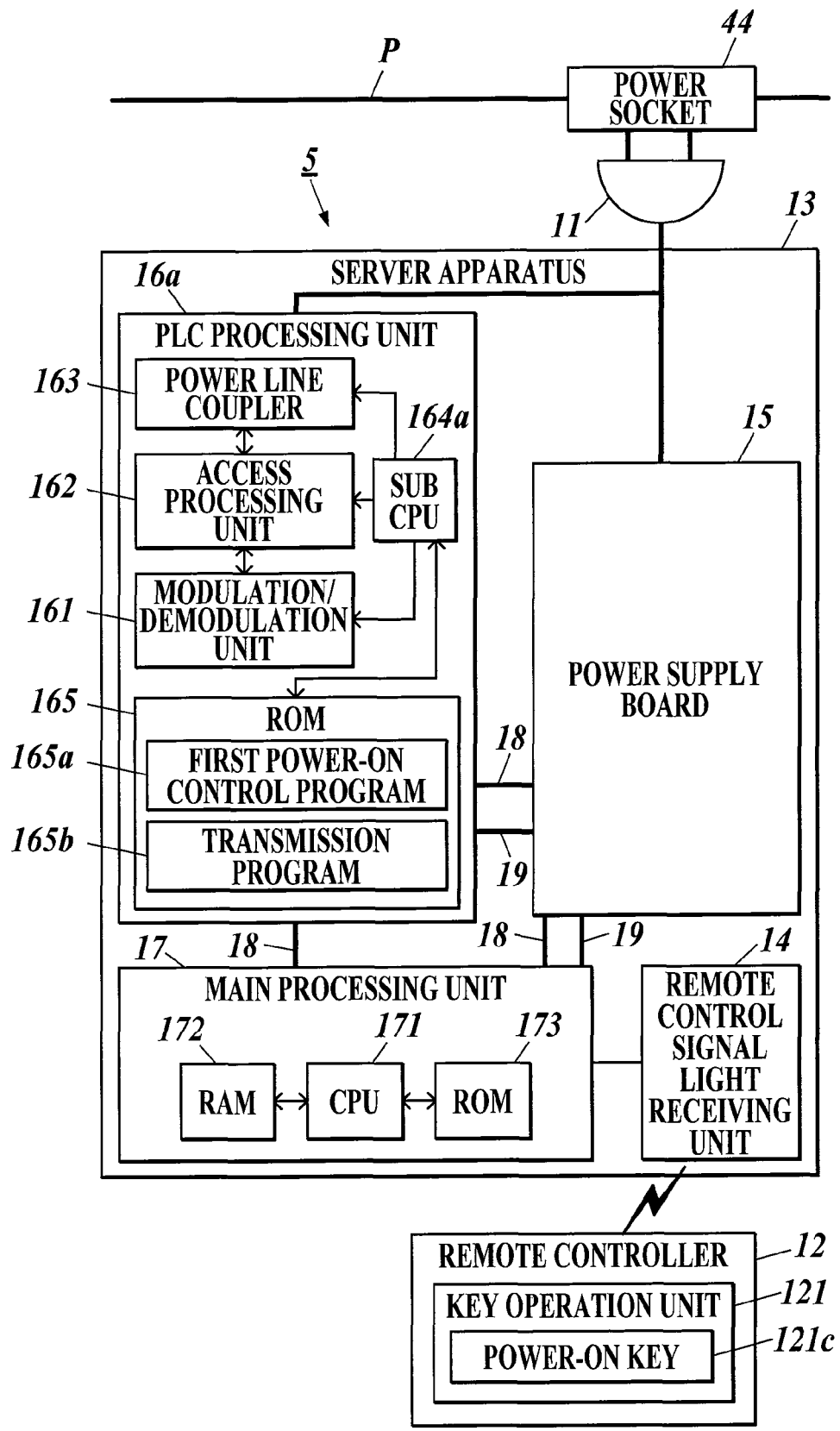
FIG. 8 is a block diagram illustrating the server apparatus in the power line communication system of Embodiment 2.

As shown in FIG. 8, the server apparatus 5 comprises: the power plug 11; the key operation unit 121 of the remote controller 12 or the like; the remote control signal light receiving unit 14, the power supply board 15, a PLC processing unit 16a, the main processing unit 17, which are provided in the apparatus body 13; and the like. The server apparatus 5 is connected by the power plug 11 to the power socket 44 provided in one room R. The power supply board 15, the PLC processing unit 16a and the main processing unit 17 are connected by the control bus 18, and further, the PLC processing unit 16a and the main processing unit 17 are connected to the power supply board 15 by the power switch line 19.

The key operation unit 121 comprises a plurality of keys, and for example, is provided in the remote controller 12 for remotely operating the server apparatus 5. In the key operation unit 121 provided in the remote controller 12 or the like, when the key is pressed by the user, an input operation signal corresponding to the pressed key is outputted, and the input operation signal is outputted to the main processing unit 17 through the remote control signal light receiving unit 14 provided in the apparatus body 13.

For example, the key operation unit 121 comprises: the power-on key 121*c* for turning on/off the server apparatus 5, and further, for turning on/off the power of the client terminal apparatus 6 connected to the server apparatus 5 through the power line P by the remote control; and the like.

For example, the PLC processing unit 16*a* comprises: the modulation/demodulation unit 161; the access processing unit 162; the D/A converter (not shown); the BPF (not shown) for a transmission signal; the amplifier (not shown); the power line coupler 163; the BPF (not shown) for a reception signal; the AGC circuit (not shown); the A/D converter (not shown); a sub CPU 164*a*; a ROM 165; and the like.

In a standby mode where the PLC processing unit 16*a* is supplied with the power and is turned to the power-on state, and where the main processing unit 17 is not supplied with the power and is turned to the power-off state, the sub CPU 164*a* controls each element of the power supply board 15 and the PLC processing unit 16*a*.

For example, the ROM 165 stores a variety of control programs such as a first power-on control program 165*a* and a transmission program 165*b*.

For example, the first power-on control program 165*a* is a program for allowing the sub CPU 164*a* to realize a function to turn on the server apparatus 5 based on the key operation of the power-on key 121*c*.

Specifically, when the power-on key 121*c* provided in the key operation unit 121 of the remote controller 12 is pressed by the user, an input operation signal corresponding to the power-on key 121*c* is inputted to the main processing unit 17 through the remote control signal light receiving unit 14. When the input operation signal corresponding to the power-on key 121*c* is inputted from the key operation unit 121, a control signal for instructing the power-on, is sent to the power supply board 15 by the sub CPU 164*a* based on the input operation signal. Then, the sub CPU 164*a* allows the power supply board 15 to perform predetermined power processing for the power supplied from the power line P through the power plug 11, allows the power switch line 19 to supply the power to the main processing unit 17, and allows the main processing unit 17 which was in the power-off state, to shift to the power-on state. Therefore, the server apparatus 5 shifts to the power-on mode.

The CPU 164*a* executes the first power-on control program 165*a* described above, to function as the first power-on control unit.

For example, the transmission program 165*b* is a program for allowing the sub CPU 164*a* to realize a function to transmit the power-on request signal Sg1 for requesting the client terminal apparatus 6 to be turned on, to the client terminal apparatus 6 through the power line P based on the key operation of the power-on key 121*c*.

Specifically, when the power-on key 121*c* provided in the key operation unit 121 of the remote controller 12 is pressed by the user, the input operation signal corresponding to the power-on key 121*c* is inputted to the main processing unit 17 through the remote control signal light receiving unit 14. When the input operation signal corresponding to the power-on key 121*c* is inputted from the key operation unit 121, the power-on request signal Sg1 for requesting the client terminal 6 connected to the server apparatus 5 through the power line P to be turned on is outputted to the PLC processing unit 16*a* by the sub CPU 164*a*. Then, the sub CPU 164*a* allows the modulation/demodulation unit 161 of the PLC processing unit 16*a* to convert the power-on request signal Sg1 into the format of the power-line superimposition signal, and thereafter allows the access processing unit 162 to add a destination header indicating an address of the client terminal apparatus 6 and a transmission source header indicating an address of the server apparatus 5. Moreover, the CPU 164*a* allows the power line coupler 163 to superimpose the power-line superimposition signal that is based on the first power-on request signal Sg1, on the power line P. Thereby, the power-line superimposition signal is transmitted to the client terminal apparatus 6 through the power line P.

The sub CPU 164*a* executes the transmission program 165*b* to function as the transmission unit.

(Configuration of Client Terminal Apparatus)

Next, a description will be made of a configuration of the client terminal apparatus 6 while referring to FIG. 9.

Figure 9:
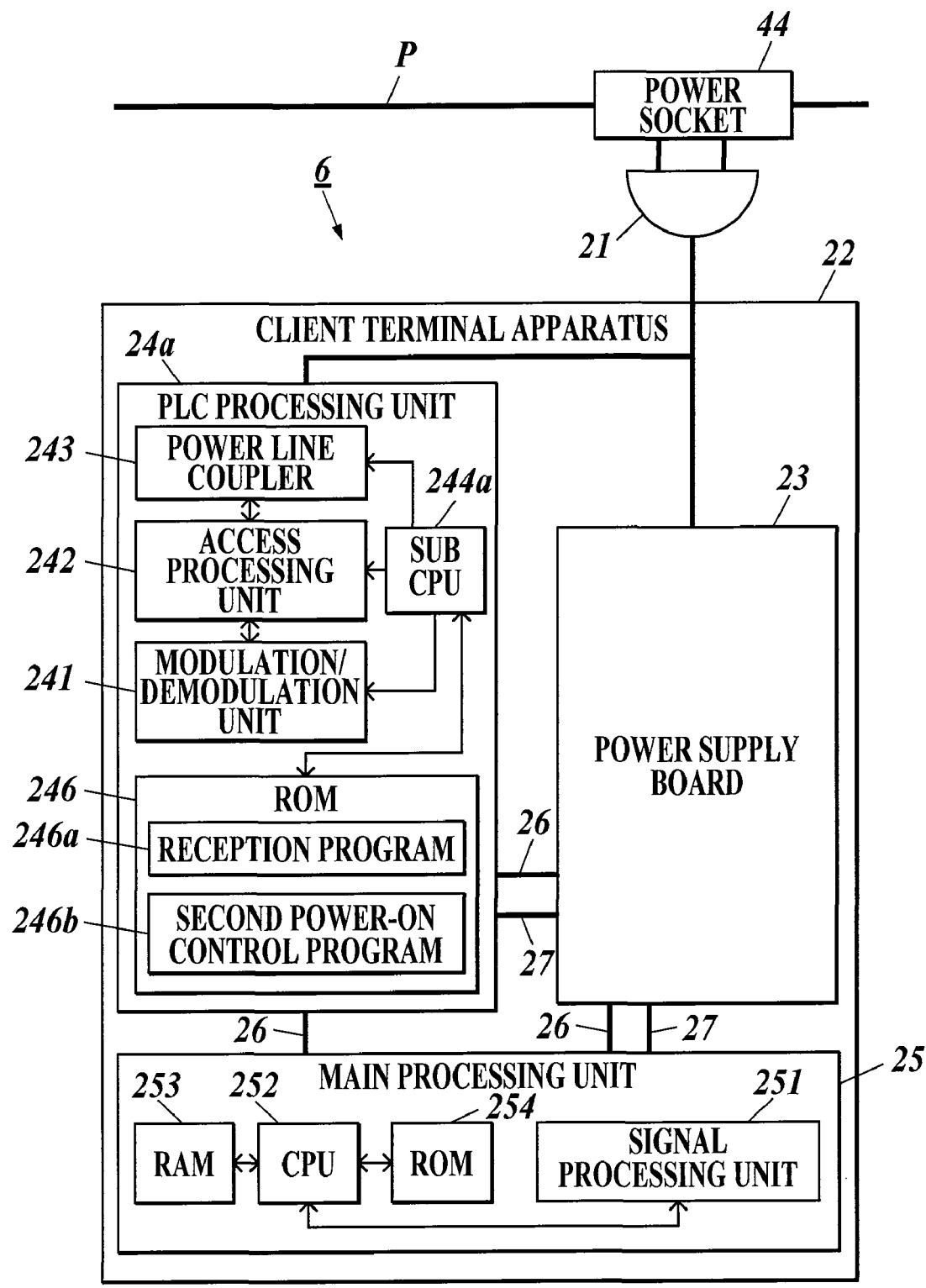
FIG. 9 is a block diagram illustrating a client terminal apparatus in the power line communication system of Embodiment 2.

As shown in FIG. 9, the client terminal apparatus 6 comprises: the power plug 21; the power supply board 23, a PLC processing unit 24*a*, and the main processing unit 25, which are provided in the apparatus body 22; and the like. The client terminal apparatus 6 is connected by the power plug 21 to the power socket 44 provided in one room R. The power supply board 23, the PLC processing unit 24*a* and the main processing unit 25 are connected by the control bus 26, and further, the PLC processing unit 24*a* and the main processing unit 25 are connected to the power supply board 23 by the power switch line 27.

For example, the first PLC processing unit 24*a* comprises: the modulation/demodulation unit 241; the access processing unit 242; the D/A converter (not shown); the BPF (not shown) for a transmission signal; the amplifier (not shown); the power line coupler 243; the BPF (not shown) for a reception signal; the AGC circuit (not shown); the A/D converter (not shown); a sub CPU 244*a*; a ROM 246; and the like.

In a standby mode where the PLC processing unit 24*a* is supplied with the power and is turned to the power-on state, and where the main processing unit 25 is not supplied with the power and is turned to the power-off state, the sub CPU 244*a* controls each element of the power supply board 23 and the PLC processing unit 24*a*.

For example, the ROM 246 stores a variety of control programs such as a reception program 246*a* and a second power-on control program 246*b*.

For example, the reception program 246*a* is a program for allowing the sub CPU 244*a* to realize a function to receive the power-on request signal Sg1 transmitted from the server apparatus 5 through the power line P.

Specifically, when the power-line superimposition signals superimposed on the power line P are extracted by the power line coupler 243 of the PLC processing unit 24*a*, the sub CPU 244*a* allows the access processing unit 242 to obtain a power-line superimposition signal that is based on the power-on request signal Sg1, to which the destination header indicating the address of the client terminal apparatus 6 is added, among the extracted power-line superimposition signals. Thereafter, the sub CPU 244*a* allows the modulation/demodulation unit 241 to demodulate the obtained power-line superimposition signal and to convert the power-line superimposition signal into the power-on request signal Sg1 for requesting the client terminal apparatus 6 to be turned on.

The sub CPU 244*a* executes the reception program 246*a* described above, to function as the reception unit.

For example, the second power-on control program 246*b* is a program for allowing the sub CPU 244*a* to realize a function to turn on the client terminal apparatus 6 based on the power-on request signal Sg1 received by the execution of the reception program 246*a*.

Specifically, when the power-on request signal Sg1 is received by the execution of the above-described reception program 246*a*, the control signal for instructing the power-on, is sent to the power supply board 23 by the sub CPU 244*a* based on the power-on request signal Sg1. Then, the sub CPU 244*a* allows the power supply board 23 to perform predetermined power processing for the power supplied from the power line P through the power plug 21, and allows the power switch line 27 to supply the power to the main processing unit 25. In such a way, the sub CPU 244*a* allows the main processing unit 25 which was in the power-off state, to shift to the power-on state. Thereby, the client terminal apparatus 6 shifts to the power-on mode.

The sub CPU 244*a* executes the power-on control program described above, to function as the second power-on control unit.

Figure 10:
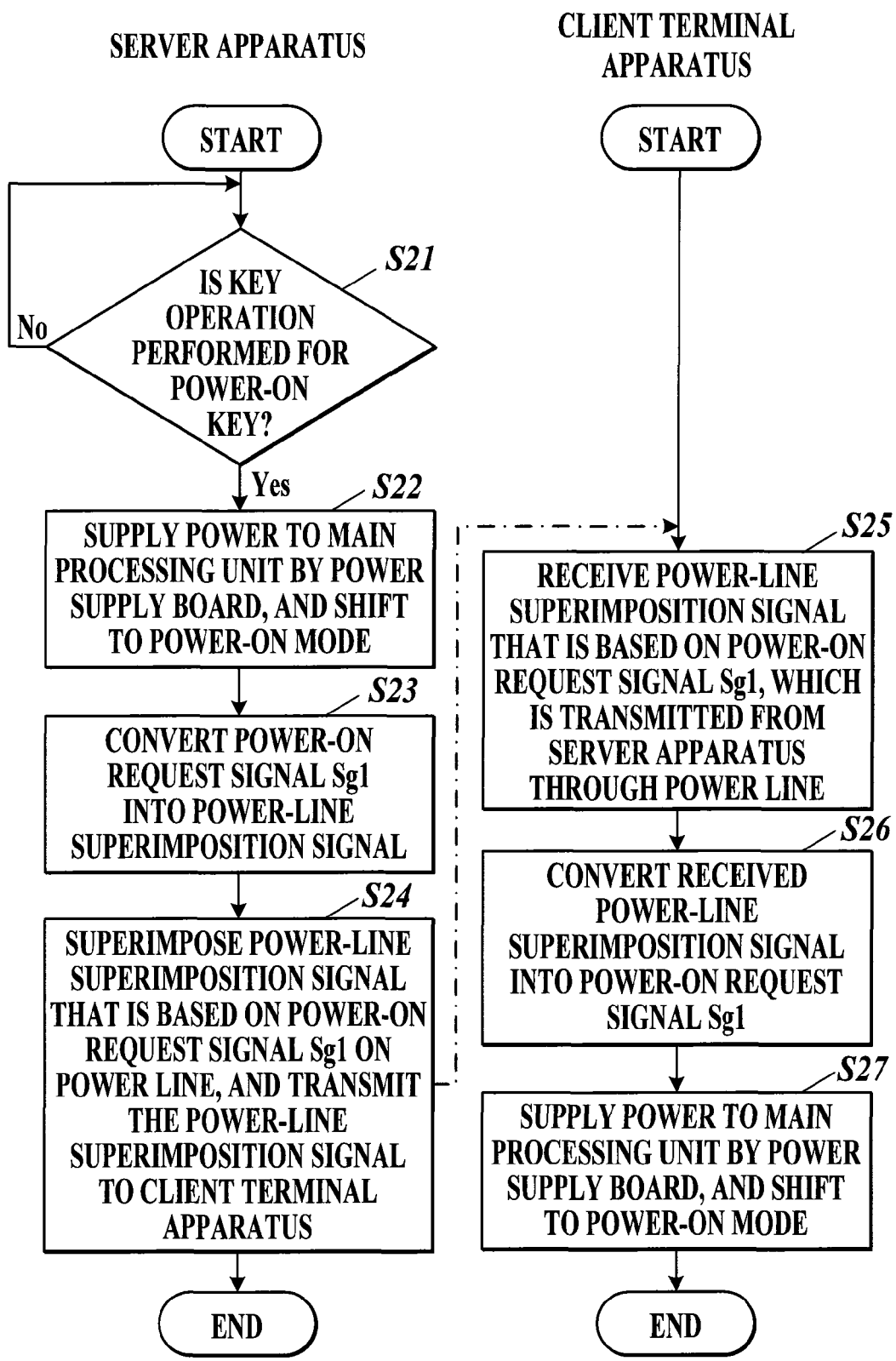
FIG. 10 is a flowchart illustrating remote activation processing in the power line communication system of Embodiment 2.

Next, while referring to FIG. 10, a description will be made of remote activation processing executed in the server apparatus 5 and the client terminal apparatus 6.

First, in the standby mode, the sub CPU 164*a* in the PLC processing unit 16*a* of the server apparatus 5 monitors the key operation in the key operation unit 121. In Step S21, the sub CPU 164*a* determines whether or not the power-on key 121*c* in the key operation unit 121 is operated. In the case of determining that the power-on key 121*c* is operated in Step S21 (Step S21; Yes), in Step S22, the control signal for instructing the power-on, is sent to the power supply board 15 by the sub CPU 164*a* of the server apparatus 5 based on the key operation of the power-on key 121*c*. Then, the sub CPU 164*a* allows the power supply board 15 to supply the power to the main processing unit 17 which was in the power-off state, and allows the main processing unit 17 to shift to the power-on state. Therefore, the client terminal apparatus 6 shifts from the standby mode to the power-on mode. Next, in Step S23, the sub CPU 164*a* allows the modulation/demodulation unit 161 and the access processing unit 162 of the PLC processing unit 16*a* to convert the power-on request signal Sg1 for requesting the client terminal apparatus 6 to be turned on, into the power-line superimposition signal. Then, in Step S24, the sub CPU 164*a* allows the power line coupler 163 of the PLC processing unit 16*a* to superimpose the power-line superimposition signal that is based on the power-on request signal Sg1, on the power line P. Thereby, the power-on request signal Sg1 is transmitted to the client terminal apparatus 6, and this processing is ended.

Next, in Step S25, in the standby mode, the sub CPU 244*a* in the PLC processing unit 24*a* of the client terminal apparatus 6 allows the power line coupler 243 and the access processing unit 242 of the PLC processing unit 24*a* to obtain the power-line superimposition signal that is based on the power-on request signal Sg1, which is transmitted from the server apparatus 5. Then, in Step S26, the sub CPU 244*a* allows the modulation/demodulation unit 241 of the PLC processing unit 24*a* to demodulate the power-line superimposition signal and to convert the power-line superimposition signal into the power-on request signal Sg1. Then, in Step S27, the control signal for instructing the power-on, is sent to the power supply board 23 based on the power-on request signal Sg1 transmitted from the server apparatus 5. Then, the sub CPU 244*a* allows the power supply board 23 to supply the power to the main processing unit 25 which was in the power-off state, and allows the main processing unit 25 to shift to the power-on state. Therefore, the client terminal apparatus 6 shifts from the standby mode to the power-on mode, and this processing is ended.

In accordance with the power line communication system 200 of Embodiment 2 according to the present invention as described above, the server apparatus 5 comprises the key operation unit 121*c* for turning on the apparatuses. By the sub CPU 166*a* executing the first power-on control program 165*a*, the server apparatus 5 is turned on based on the key operation of the power-on key 121*c*. Moreover, by the sub CPU 166*a* executing the transmission program 165*b*, the power-on request signal for requesting the client terminal apparatus 6 to be turned on, is transmitted to the client terminal apparatus 6 through the power line P based on the key operation of the power-on key 121*c*. Furthermore, by the sub CPU 244*a* executing the reception program 246*a*, in the client terminal apparatus 6, the power-on request signal transmitted from the server apparatus 5 through the power line P is received. Moreover, by executing the second power-on control program 246*b*, the client terminal apparatus 6 is turned on based on the power-on request signal received by the execution of the reception program 246*a*.

Hence, by applying the remote activation system for activating the electronic instruments connected to the power line P by the remote operation, to the power line communication system 200 for transmitting or receiving the information among the plurality of electronic instruments connected through the power line P, it is possible to reduce the cost and the burden which are required for constructing the system. Moreover, when the server apparatus 5 is turned on, the client terminal apparatus 6 connected to the server apparatus 5 is automatically turned on. Therefore, the convenience of the electronic instruments can be enhanced.

Note that, in the present invention, various modifications and design changes may be performed within the scope without departing form the gist of the present invention.

For example, although the PLC processing units in the embodiments are configured to be provided in the main bodies of the apparatuses, respectively, these processing units may be configured to be provided separately from the main bodies. For example, the PLC modem comprising a power plug connected to the power socket 44 of the room R and another power socket connected to the power plug of the apparatus, is placed between the power socket 44 of the room R and the main body.

Moreover, in the above-described embodiments, it is described that the power-on request signal transmitted from the electronic instrument (for example, the first client terminal apparatus 2 in Embodiment 1, or the server apparatus 5 in Embodiment 2) is transmitted based on the control in the PLC processing unit. However, the power-on request signal may be transmitted based on control in the main processing unit.

Furthermore, the type and the number of the electronic instruments according to the present invention are not limited to those illustrated in the above-described embodiments.

Moreover, a table for storing the correspondence of each electronic instrument may be provided in each electronic instrument, and the power control may be performed by determining the electronic instrument required to be turned on based on the table.

In accordance with a first aspect of the invention, a power line communication system comprises: a first electronic instrument, a second electronic instrument and a third electronic instrument, wherein information is received or transmitted among the first electronic instrument, the second electronic instrument and the third electronic instrument which are connected through a communication line using a power line, wherein the first electronic instrument comprises:

a key operation unit for accepting a key operation performed by a user; and a first transmission unit for transmitting a first power-on request signal for requesting the second electronic instrument to be turned on, to the second electronic instrument through the power line based on the key operation in the key operation unit, the second electronic instrument comprises:

a first main processing unit which is turned to a power-on state by receiving power in a power-on mode; and a first PLC processing unit which is turned to a power-on state by receiving power in a standby mode where the first main processing unit is turned to a power-off state, wherein the first PLC processing unit comprises:

a first reception unit for receiving the first power-on request signal transmitted from the first electronic instrument through the power line in the standby mode;

a first power-on control unit for supplying the power to the first main processing unit and for turning the first main processing unit to the power-on mode based on the first power-on request signal received by the first reception unit; and a second transmission unit for transmitting a second power-on request signal for requesting the third electronic instrument to be turned on, to the third electronic instrument through the power line based on the first power-on request signal received by the first reception unit, and the third electronic instrument comprises:

a second main processing unit which is turned to a power-on state by receiving power; and a second PLC processing unit which is turned to a power-on state by receiving power in a standby mode where the second main processing unit is turned to the power-off state, wherein the second PLC processing unit comprises:

a second reception unit for receiving the second power-on request signal transmitted from the second electronic instrument through the power line in the standby mode; and a second power-on control unit for supplying the power to the second main processing unit and for turning the second main processing unit to the power-on mode based on the second power-on request signal received by the second reception unit.

According to the first aspect of the invention, in the first electronic instrument, the key operation unit for accepting the key operation performed by the user is provided, and the first power-on request signal for requesting the second electronic instrument to be turned on is transmitted to the second electronic instrument through the power line by the first transmission unit based on the key operation in the key operation unit. In the second electronic instrument, the first main processing unit which is turned to the power-on state by receiving the power in the power-on mode, and the first PLC processing unit which is turned to the power-on state by receiving the power in the standby mode where the first main processing unit is turned to the power-off state, are provided. In the first PLC processing unit, the first power-on request signal transmitted from the first electronic instrument through the power line is received by the first reception unit in the standby mode. Moreover, the first main processing unit is supplied with the power and turned to the power-on mode by the first power-on control unit based on the first power-on request signal received by the first reception unit. Furthermore, the second power-on request signal for requesting the third electronic instrument to be turned on is transmitted to the third electronic instrument through the power line by the second transmission unit based on the first power-on request signal received by the first reception unit. In the third electronic instrument, the second main processing unit which is turned to the power-on state by receiving the power in the power-on mode, and the second PLC processing unit which is turned to the power-on state by receiving the power in the standby mode where the second main processing unit is turned to the power-off state, are provided. In the second PLC processing unit, the second power-on request signal transmitted from the second electronic instrument through the power line is received by the second reception unit in the standby mode. Moreover, the second main processing unit is supplied with the power and turned to the power-on mode by the second power-on control unit based on the second power-on request signal received by the second reception unit.

Hence, by applying a remote activation system for activating the electronic instruments connected to the power line by the remote operation, to the power line communication system for transmitting or receiving the information among the plurality of electronic instruments connected through the power line, it is possible to reduce the cost and the burden which are required for constructing the system. Moreover, when the power is supplied to the PLC processing unit of the electronic instrument to be remotely activated, it is unnecessary to supply the power to the main processing unit. Therefore, it is possible to reduce standby consumption of the electronic instrument to be remotely activated. Furthermore, by simply performing the predetermined key operation in the first electronic instrument, it becomes possible to remotely activate the second electronic instrument and the third electronic instrument which are connected to the first electronic instrument. Therefore, the convenience of the electronic instrument can be enhanced.

In accordance with a second aspect of the invention, a power line communication system comprises: a first electronic instrument and a second electronic instrument, wherein information is received or transmitted between the first electronic instrument and the second electronic instrument which are connected through a communication line using a power line, wherein the first electronic instrument comprises:

a key operation unit for accepting a key operation performed by a user; and a transmission unit for transmitting a power-on request signal for requesting the second electronic instrument to be turned on, to the second electronic instrument through the power line based on the key operation in the key operation unit, and the second electronic instrument comprises:

a reception unit for receiving the power-on request signal transmitted from the first electronic instrument through the power line; and a power-on control unit for turning on the second electronic instrument based on the power-on request signal received by the reception unit.

According to the second aspect of the invention, in the first electronic instrument, the key operation unit for accepting the key operation performed by the user is provided, and the power-on request signal for requesting the second electronic instrument to be turned on is transmitted to the second electronic instrument through the power line by the transmission unit based on the key operation in the key operation unit. Moreover, in the second electronic instrument, the power-on request signal transmitted from the first electronic instrument through the power line is received by the reception unit, and the second electronic instrument is turned on by the power-on control unit based on the power-on request signal received by the reception unit.

Hence, by applying the remote activation system for activating the electronic instruments connected to the power line by the remote operation, to the power line communication system for transmitting or receiving the information between the plurality of electronic instruments connected through the power line, it is possible to reduce the cost and the burden which are required for constructing the system. Moreover, by simply performing the predetermined key operation in the first electronic instrument, it becomes possible to remotely activate the second electronic instrument connected to the first electronic instrument. Therefore, the convenience of the electronic instrument can be enhanced.

In accordance with a third aspect of the invention, a power line communication system comprises: a first electronic instrument and a second electronic instrument, wherein information is received or transmitted between the first electronic instrument and the second electronic instrument which are connected through a communication line using a power line, wherein the first electronic instrument comprises:

a power-on key for turning on the first electronic instrument or the second electronic instrument;

a first power-on control unit for turning on the first electronic instrument based on a key operation of the power-on key; and a transmission unit for transmitting a power-on request signal for requesting the second electronic instrument to be turned on, to the second electronic instrument through the power line based on a key operation of the power-on key, and the second electronic instrument comprises:

a reception unit for receiving the power-on request signal transmitted from the first electronic instrument through the power line; and a second power-on control unit for turning on the second electronic instrument based on the power-on request signal received by the reception unit.

According to the third aspect of the invention, in the first electronic instrument, the power-on key for turning on the first electronic instrument or the second electronic instrument is provided, the first electronic instrument is turned on by the first power-on control unit based on the key operation of the power-on key, and the power-on request signal for requesting the second electronic instrument to be turned on is transmitted to the second electronic instrument through the power line by the transmission unit based on the key operation of the power-on key. Moreover, in the second electronic instrument, the power-on request signal transmitted from the first electronic instrument through the power line is received by the reception unit, and the second electronic instrument is turned on by the second power-on control unit based on the power-on request signal received by the reception unit.

Hence, by applying the remote activation system for activating the electronic instruments connected to the power line by the remote operation, to the power line communication system for transmitting or receiving the information between the plurality of electronic instruments connected through the power line, it is possible to reduce the cost and the burden which are required for constructing the system. Moreover, when the first electronic instrument is turned on, the second electronic instrument connected to the first electronic instrument is automatically turned on. Therefore, the convenience of the electronic instruments can be enhanced.

In the second aspect of the invention, preferably, the power line communication system further comprises: a third electronic instrument connected to the second electronic instrument through the communication line using the power line, wherein the second electronic instrument comprises:

a second transmission unit for transmitting a second power-on request signal for requesting the third electronic instrument to be turned on, to the third electronic instrument through the power line based on the power-on request signal received by the reception unit, and the third electronic instrument comprises:

a second reception unit for receiving the second power-on request signal transmitted from the second electronic instrument through the power line; and a second power-on control unit for turning on the third electronic instrument based on the second power-on request signal received by the second reception unit.

According to this system, in the second electronic instrument, the second power-on request signal for requesting the third electronic instrument to be turned on is transmitted to the third electronic instrument through the power line based on the power-on request signal received by the reception unit. Moreover, in the third electronic instrument, the second power-on request signal transmitted from the second electronic instrument through the power line is received, and the third electronic instrument is turned on by the second power-on control unit based on the second power-on request signal received by the second reception unit.

Hence, by simply performing the predetermined key operation in the first electronic instrument, it becomes possible to remotely activate the second electronic instrument and the third electronic instrument which are connected to the first electronic instrument. Therefore, the convenience of the electronic instruments can be enhanced.

The entire disclosure of Japanese Patent Application No. 2006-325909 filed on Dec. 1, 2006 including description, claims, drawings, and abstract are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:

1. A power line communication system comprising: a first electronic instrument, a second electronic instrument and a third electronic instrument, wherein information is received or transmitted among the first electronic instrument, the second electronic instrument and the third electronic instrument which are connected through a communication line using a power line, wherein the first electronic instrument comprises:
a key operation unit for accepting a key operation performed by a user; and
a first transmission unit for transmitting a first power-on request signal for requesting the second electronic instrument to be turned on, to the second electronic instrument through the power line based on the key operation in the key operation unit, the second electronic instrument comprises:
a first main processing unit which is turned to a power-on state by receiving power in a power-on mode; and
a first PLC processing unit which is turned to a power-on state by receiving power in a standby mode where the first main processing unit is turned to a power-off state, wherein the first PLC processing unit comprises:

a first reception unit for receiving the first power-on request signal transmitted from the first electronic instrument through the power line in the standby mode;

a first power-on control unit for supplying the power to the first main processing unit and for turning the first main processing unit to the power-on mode based on the first power-on request signal received by the first reception unit; and a second transmission unit for transmitting a second power-on request signal for requesting the third electronic instrument to be turned on, to the third electronic instrument through the power line based on the first power-on request signal received by the first reception unit, and the third electronic instrument comprises:

a second main processing unit which is turned to a power-on state by receiving power; and a second PLC processing unit which is turned to a power-on state by receiving power in a standby mode where the second main processing unit is turned to the power-off state, wherein the second PLC processing unit comprises:

a second reception unit for receiving the second power-on request signal transmitted from the second electronic instrument through the power line in the standby mode; and a second power-on control unit for supplying the power to the second main processing unit and for turning the second main processing unit to the power-on mode based on the second power-on request signal received by the second reception unit.

2. A power line communication system comprising: a first electronic instrument and a second electronic instrument, wherein information is received or transmitted between the first electronic instrument and the second electronic instrument which are connected through a communication line using a power line, and a third electronic instrument connected to the second electronic instrument through the communication line using the power line, wherein the first electronic instrument comprises:

a key operation unit for accepting a key operation performed by a user; and a transmission unit for transmitting a power-on request signal for requesting the second electronic instrument to be turned on, to the second electronic instrument through the power line based on the key operation in the key operation unit, and the second electronic instrument comprises:

a reception unit for receiving the power-on request signal transmitted from the first electronic instrument through the power line;

a power-on control unit for turning on the second electronic instrument based on the power-on request signal received by the reception unit; and a second transmission unit for transmitting a second power-on request signal for requesting the third electronic instrument to be turned on, to the third electronic instrument through the power line based on the power-on request signal received by the reception unit, and the third electronic instrument comprises:

a second reception unit for receiving the second power-on request signal transmitted from the second electronic instrument through the power line.

3. A power line communication system comprising: a first electronic instrument and a second electronic instrument, wherein information is received or transmitted between the first electronic instrument and the second electronic instrument which are connected through a communication line using a power line, and a third electronic instrument connected to the second electronic instrument through the communication line using the power line, wherein the first electronic instrument comprises:

a power-on key for turning on the first electronic instrument or the second electronic instrument;

a first power-on control unit for turning on the first electronic instrument based on a key operation of the power-on key; and a transmission unit for transmitting a power-on request signal for requesting the second electronic instrument to be turned on, to the second electronic instrument through the power line based on a key operation of the power-on key, and the second electronic instrument comprises:

a reception unit for receiving the power-on request signal transmitted from the first electronic instrument through the power line;

a second power-on control unit for turning on the second electronic instrument based on the power-on request signal received by the reception unit; and a second transmission unit for transmitting a second power-on request signal for requesting the third electronic instrument to be turned on, to the third electronic instrument through the power line based on the power-on request signal received by the reception unit, and the third electronic instrument comprises:

a second reception unit for receiving the second power-on request signal transmitted from the second electronic instrument through the power line.

4. The power line communication system as claimed in claim 2, wherein the third electronic instrument further comprises:

a second power-on control unit for turning on the third electronic instrument based on the second power-on request signal received by the second reception unit.

* * * * *